United States Patent
Kihara et al.

(10) Patent No.: US 12,194,847 B2
(45) Date of Patent: Jan. 14, 2025

(54) ACCELERATOR DEVICE

(71) Applicant: DENSO CORPORATION, Kariya (JP)

(72) Inventors: Noriyasu Kihara, Kariya (JP); Takashi Iguchi, Kariya (JP); Yasuhiro Otaka, Kariya (JP); Takehiro Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/337,956

(22) Filed: Jun. 20, 2023

(65) Prior Publication Data
US 2023/0331083 A1      Oct. 19, 2023

Related U.S. Application Data

(63) Continuation of application No. PCT/JP2021/040750, filed on Nov. 5, 2021.

(30) Foreign Application Priority Data

Dec. 21, 2020 (JP) ................. 2020-210940

(51) Int. Cl.
*B60K 26/02* (2006.01)
*G05G 1/30* (2008.04)

(52) U.S. Cl.
CPC ............ *B60K 26/02* (2013.01); *G05G 1/30* (2013.01)

(58) Field of Classification Search
CPC .. G05G 1/30; G05G 1/38; G05G 1/44; G05G 1/46; G05G 25/04; B60K 26/02
See application file for complete search history.

(56) References Cited

U.S. PATENT DOCUMENTS

| 8,464,604 | B2 * | 6/2013 | Watanabe | G05G 1/38 74/513 |
| 10,427,521 | B2 * | 10/2019 | Kihara | G05G 25/04 |
| 11,543,848 | B2 * | 1/2023 | Kihara | G05G 25/02 |
| 2012/0085196 | A1 * | 4/2012 | Watanabe | B60K 26/021 74/513 |

FOREIGN PATENT DOCUMENTS

| CN | 110182049 A | * | 8/2019 |
| CN | 115303237 A | * | 11/2022 |
| EP | 1777095 A2 | | 4/2007 |

* cited by examiner

*Primary Examiner* — Adam D Rogers
(74) *Attorney, Agent, or Firm* — Nixon & Vanderhye P.C.

(57) ABSTRACT

An accelerator device includes a pad, a case portion having a front wall with an opening, a rear wall, a first side wall and a second side wall, an internal movable mechanism with a shaft, and an arm. The first side wall has a first bearing portion for receiving one end of the shaft, and at least one first groove portion provided vertically below a central axis of a surface facing the shaft of the first bearing portion and connected to the first bearing portion. The second side wall has a second bearing portion for receiving the other end of the shaft, and at least one second groove portion provided vertically below a central axis of a surface facing the shaft of the second bearing portion and connected to the second bearing portion.

5 Claims, 26 Drawing Sheets

ACCELERATOR DEVICE

CROSS REFERENCE TO RELATED APPLICATIONS

This application is a continuation application of International Patent Application No. PCT/JP2021/040750 filed on Nov. 5, 2021, which designated the U.S. and based on and claims the benefits of priority of Japanese Patent Application No. 2020-210940 filed on Dec. 21, 2020. The entire disclosure of all of the above applications is incorporated herein by reference.

TECHNICAL FIELD

The present disclosure relates to an accelerator device.

BACKGROUND

An organ structure type accelerator device is fixed to a vehicle body floor of a vehicle interior and detects an amount of an accelerator depression by a driver.

SUMMARY

According to one aspect of the present disclosure, an accelerator device is provided. An accelerator device includes a pad configured to move in an opening direction corresponding to an accelerator opening operation and a closing direction corresponding to an accelerator closing operation and opposite to the opening direction, a case portion configured to be attached to the vehicle body, including a front wall facing the pad and having an opening, a rear wall facing the front wall, a first side wall forming one side surface, and a second side wall forming the other side surface, an internal movable mechanism housed in the case portion and including a shaft rotatably supported by the case portion, and an arm passing through the opening and connecting the pad and the internal movable mechanism. The first side wall has a first bearing portion for receiving one end of the shaft, and at least one first groove portion provided vertically below a central axis of a surface facing the shaft of the first bearing portion and connected to the first bearing portion in a state in which the case portion is attached to the vehicle body. The second side wall has a second bearing portion for receiving the other end of the shaft, and at least one second groove portion provided vertically below a central axis of a surface facing the shaft of the second bearing portion and connected to the second bearing portion in a state in which the case portion is attached to the vehicle body.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In an assumable example, an organ structure type accelerator device is fixed to a vehicle body floor of a vehicle interior and detects an amount of an accelerator depression by a driver.

There is a possibility that water will enter an inside of a vehicle compartment during car washing or rain. In this case, water enters an outer periphery of a shaft portion inside the accelerator device, and the water freezes, thereby deteriorating an operability of the pedal of the accelerator device and generating an abnormal noise in some cases.

The present disclosure can be realized as the following embodiments.

According to one aspect of the present disclosure, an accelerator device is provided. An accelerator device includes a pad configured to move in an opening direction corresponding to an accelerator opening operation and a closing direction corresponding to an accelerator closing operation and opposite to the opening direction, a case portion configured to be attached to the vehicle body, including a front wall facing the pad and having an opening, a rear wall facing the front wall, a first side wall forming one side surface, and a second side wall forming the other side surface, an internal movable mechanism housed in the case portion and including a shaft rotatably supported by the case portion, and an arm passing through the opening and connecting the pad and the internal movable mechanism. The first side wall has a first bearing portion for receiving one end of the shaft, and at least one first groove portion provided vertically below a central axis of a surface facing the shaft of the first bearing portion and connected to the first bearing portion in a state in which the case portion is attached to the vehicle body. The second side wall has a second bearing portion for receiving the other end of the shaft, and at least one second groove portion provided vertically below a central axis of a surface facing the shaft of the second bearing portion and connected to the second bearing portion in a state in which the case portion is attached to the vehicle body.

In the accelerator device having these configurations, when water enters the inside of the case portion through the opening, the water flows in the first groove portion and the second groove portion. Therefore, water hardly remains on the shaft, the first bearing portion, and the second bearing portion. As a result, when water enters the inside of the case portion, it is possible to suppress freezing the shaft, the first bearing portion, and the second bearing portion, and to prevent deterioration of operational feeling and generation of abnormal noise.

A. First Embodiment

Figure 1:
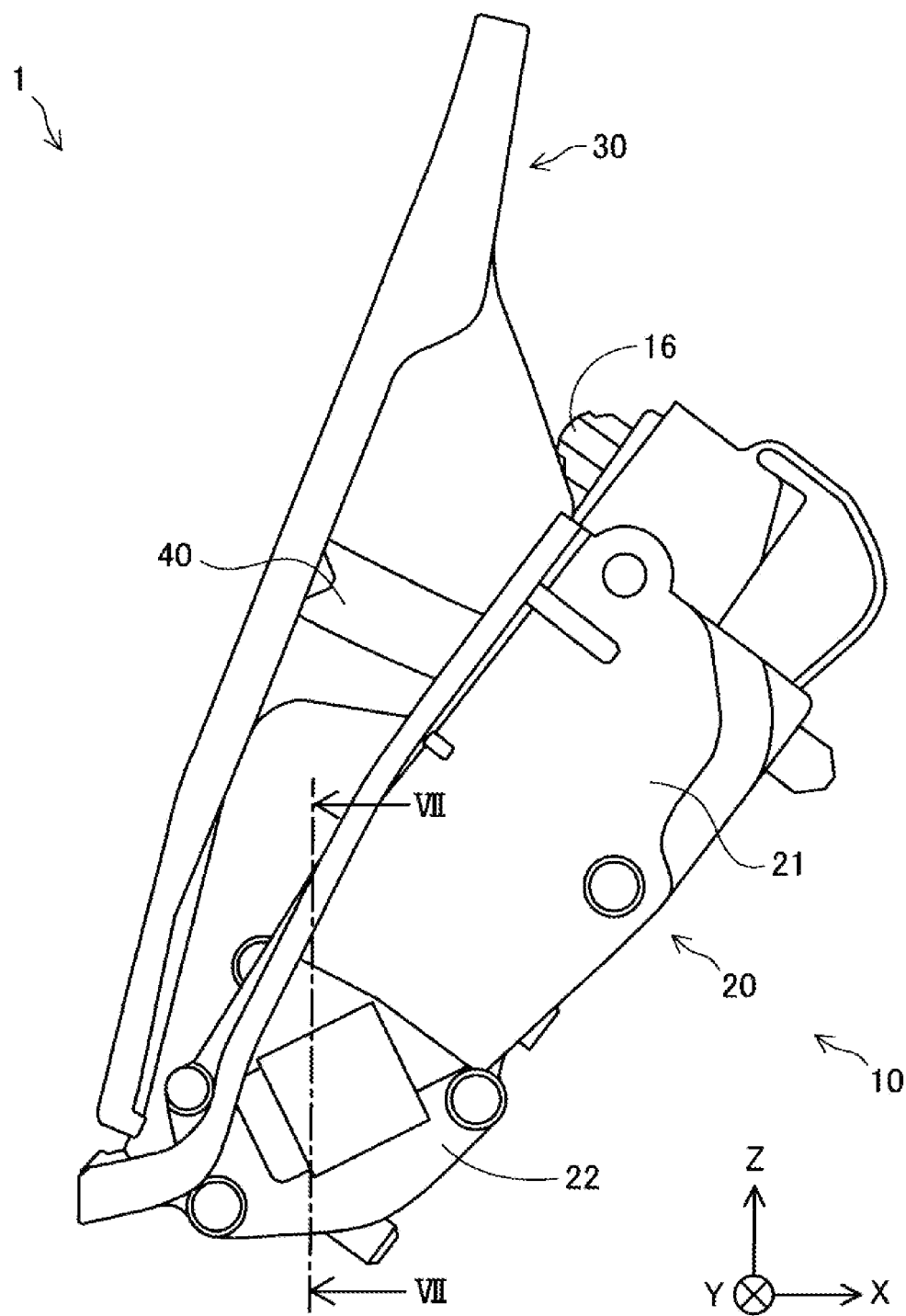
FIG. 1 is a diagram for explaining a configuration of an accelerator device according to a present embodiment.
Figure 2:
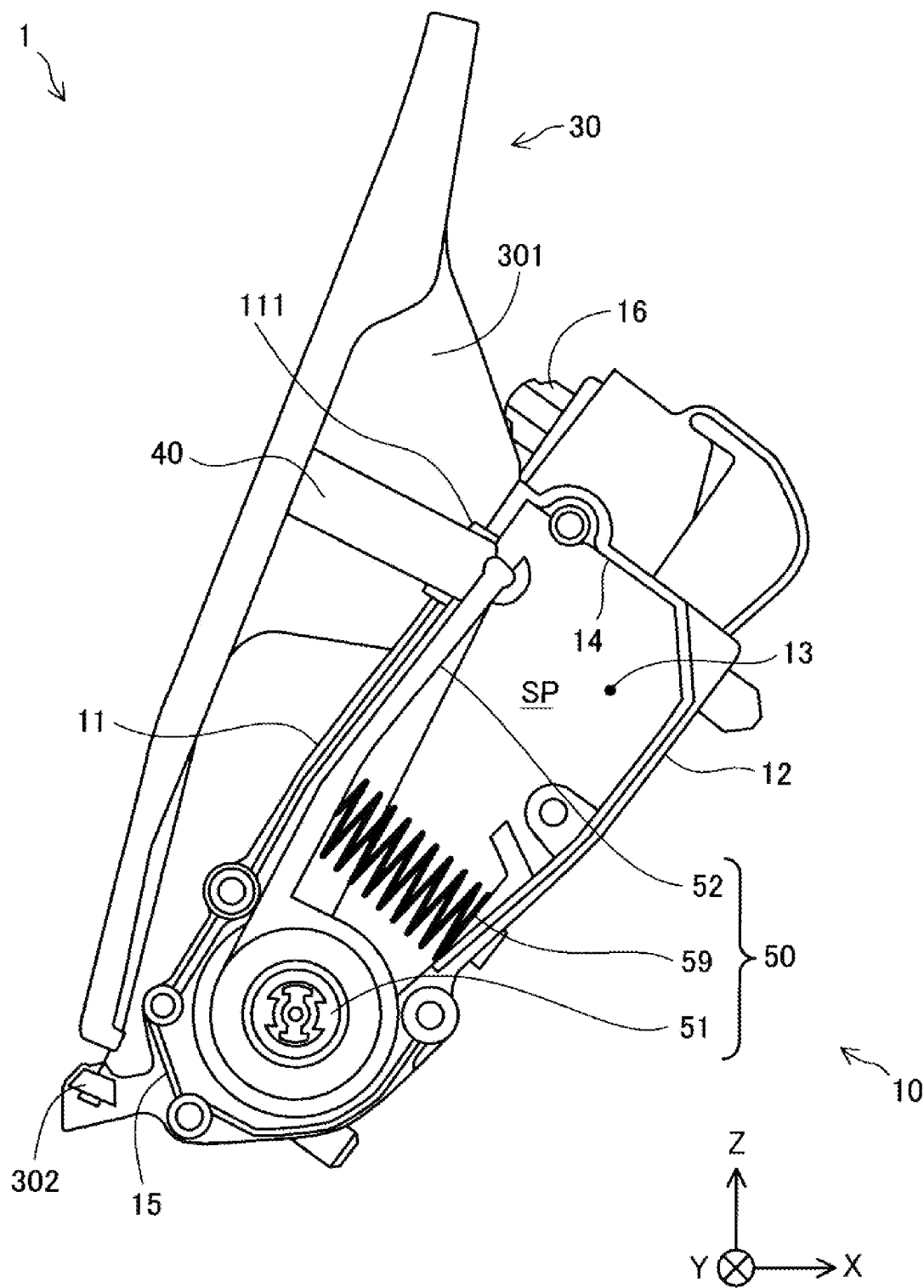
FIG. 2 is a diagram for explaining an internal structure of the accelerator device.

An accelerator device 1 is attached to a vehicle body (not shown). In FIG. 1, a X-axis direction indicates a traveling direction of the vehicle, a Y-axis direction indicates a width direction of the vehicle, and a Z-axis direction indicates a vertically upward direction. The directions of the X-axis, Y-axis, and Z-axis in FIG. 2 and other figures to be described later also indicate the same directions as in FIG. 1. Unless otherwise specified, the description of the structure and arrangement of the accelerator device 1 described below means the structure and arrangement in the installed state in which the accelerator device 1 is attached to the vehicle body. A positive direction side of the Z-axis is also called "upper side", and a negative direction side of the Z-axis is also called "vertically downward direction", "vertical direction lower side", or "lower side". As shown in FIGS. 1 and 2, the accelerator device 1 includes a case portion 10, a pad 30, an arm 40, and an internal movable mechanism 50.

The case portion 10 is an accommodation wall that surrounds an internal accommodation space SP shown in FIG. 2. The case portion 10 can be attached to the vehicle body. As shown in FIGS. 1 and 2, the case portion 10 has a front wall 11, a rear wall 12, a first side wall 20, a second side wall 13, a top wall 14, and a bottom wall 15. The front wall 11 faces pad 30. The front wall 11 is provided with an opening 111 through which the arm 40 passes. The rear wall 12 faces the front wall 11. As shown in FIG. 2, the first side wall 20 connects the front wall 11 and the rear wall 12. The first side wall 20 constitutes one side surface of the case portion 10. The first side wall 20 is separable from the other walls. As shown in FIG. 1, the first side wall 20 has a separation wall 21 and a cover 22. The separation wall 21 is positioned above the cover 22 and protects the members inside the internal accommodation space SP from the outside. The cover 22 is positioned below the separation wall 21 and protects the members inside the internal accommodation space SP from the outside. The second side wall 13 constitutes the other side surface between the front wall 11 and the rear wall 12. The top wall 14 defines one end of the internal accommodation space SP. The bottom wall 15 defines the other end of the internal accommodation space SP. The top wall 14 is positioned above the bottom wall 15.

A kickdown switch 16 is provided in the case portion 10. The kickdown switch 16 is pushed by the pad 30 when the driver strongly steps on the pad 30. As a result, it is detected that the driver has strongly stepped on the pad 30. The kickdown switch 16 is housed in a kickdown switch housing chamber formed in the case portion 10.

The pad 30 is configured to be stepped on by the driver. The pad 30 is movable in an opening direction and a closing direction of the accelerator. The opening direction corresponds to the opening operation of the accelerator. The closing direction corresponds to the closing operation of the accelerator, and is the direction opposite to the opening direction. The pad 30 has a side guard member 301 and a fulcrum member 302. The side guard member 301 guards a gap between the case portion 10 and the pad 30 so that the foot of the driver is not caught between the pad 30 and the case portion 10. The side guard member 301 is provided on the side surface of the pad 30. The fulcrum member 302 is connected to the case portion 10 to support the pad 30. The pad 30 can rotate around the point of contact with the fulcrum member 302. The fulcrum member 302 is provided at the lower end of the pad 30. The arm 40 penetrates through an opening 111 and connects the pad 30 and a later-described pedal 52 of the internal movable mechanism 50.

Figure 3:
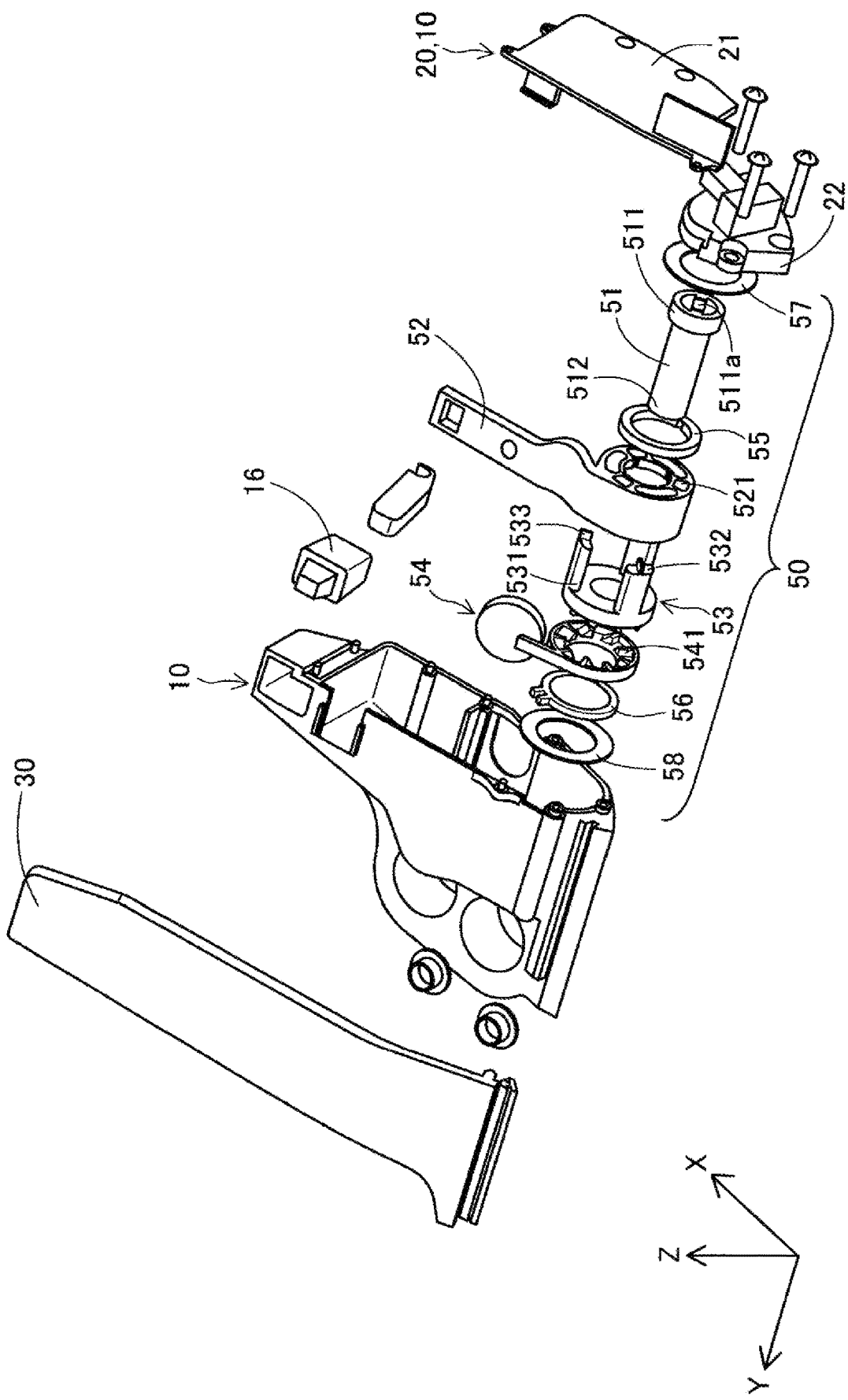
FIG. 3 is a perspective view for explaining members other than an elastic member of an internal movable mechanism.

As shown in FIG. 2, the internal movable mechanism 50 is housed inside the case portion 10. As shown in FIGS. 2 and 3, the internal movable mechanism 50 includes a shaft 51, a pedal 52, a first rotor 53, a second rotor 54, a first frictional force generator 55, and a second frictional force generator 56, a first receiving portion 57, a second receiving portion 58, and an elastic member 59.

The shaft 51 is rotatably supported by the case portion 10. A first end 511 that is one end of the shaft 51 is supported by the cover 22 of the first side wall 20. A first shaft hole 511a is formed in the first end 511. A first fitting portion 222 of the cover 22, which will be described later, is fitted into the first shaft hole 511a. A second end 512 that is the other end of the shaft 51 is supported by the second side wall 13. The pedal 52 changes the accelerator device 1 from a fully closed state to a fully opened state when the pad 30 is depressed by the driver. The pedal 52, which has been displaced to the fully opened position by being stepped on, is displaced toward the fully closed state due to the elastic deformation of the elastic member 59 when the driver's foot is released. A plurality of holes 521 are formed in the pedal 52. A projecting portion 531 of the first rotor 53, which will be described later, penetrates through the hole 521.

The first rotor 53 into which the shaft 51 is inserted is rotatable with respect to the pedal 52. As shown in FIG. 3, a plurality of projecting portions 531 are provided on the surface of the first rotor 53 on the negative direction side of the Y-axis. The projecting portions 531 penetrate through the holes 521. The projecting portions 531 are configured to protrude from the holes 521. An engaging portion 533 is formed at a rotor tip 532 that is the tip of the protruding projecting portion 531. The engaging portion 533 engages with the first frictional force generator 55 located on the negative direction side of the Y-axis of the pedal 52. The second rotor 54 into which the shaft 51 is inserted is rotatable with respect to the first rotor 53. A plurality of tooth portions 541 are provided on the surface of the second rotor 54 on the negative direction side of the Y-axis. The tooth portion 541 contacts the positive direction side of the Y-axis of the first rotor 53.

The first frictional force generator 55 generates a frictional force between the projecting portion 531 of the first rotor 53 and the case portion 10 as the first rotor 53 rotates. The first frictional force generator 55, into which the shaft 51 is inserted, is arranged between the projecting portion 531 of the first rotor 53 and the case portion 10. The first frictional force generator 55 is an annular member. The second frictional force generator 56 generates a frictional force between the second rotor 54 and the case portion 10 as the second rotor 54 rotates. The second frictional force generator 56, into which the shaft 51 is inserted, is arranged between the second rotor 54 and the case portion 10. The second frictional force generator 56 is an annular member. The first receiving portion 57 can contact the first frictional force generator 55. The first receiving portion 57 is arranged between the first frictional force generator 55 and the first side wall 20. The second receiving portion 58 can contact the second frictional force generator 56. The second receiving portion 58 is arranged between the second frictional force generator 56 and the second side wall 13.

The elastic member 59 applies force to the pedal 52 in the accelerator closing direction. As shown in FIG. 2, the elastic member 59 connects at one end to the extension part of the pedal 52.

Figure 4:
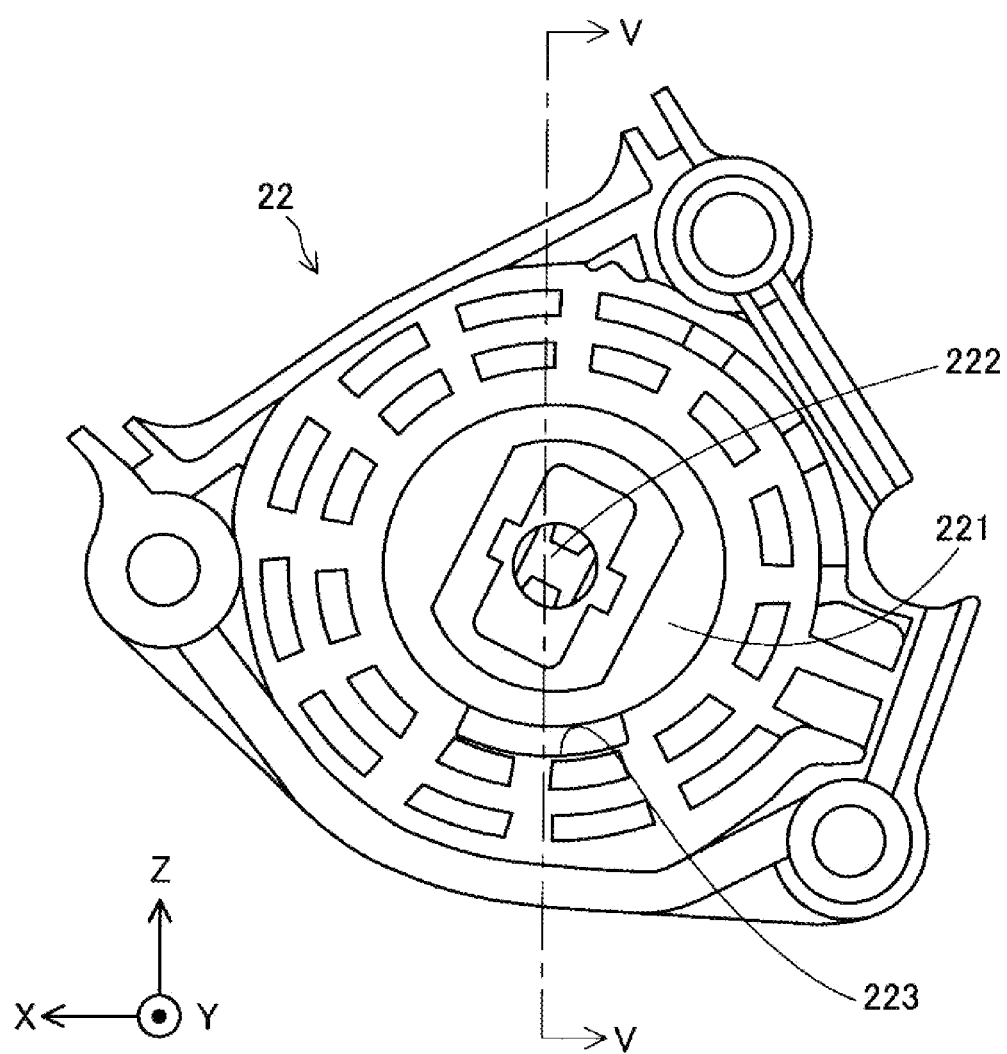
FIG. 4 is a diagram for explaining a cover.
Figure 5:
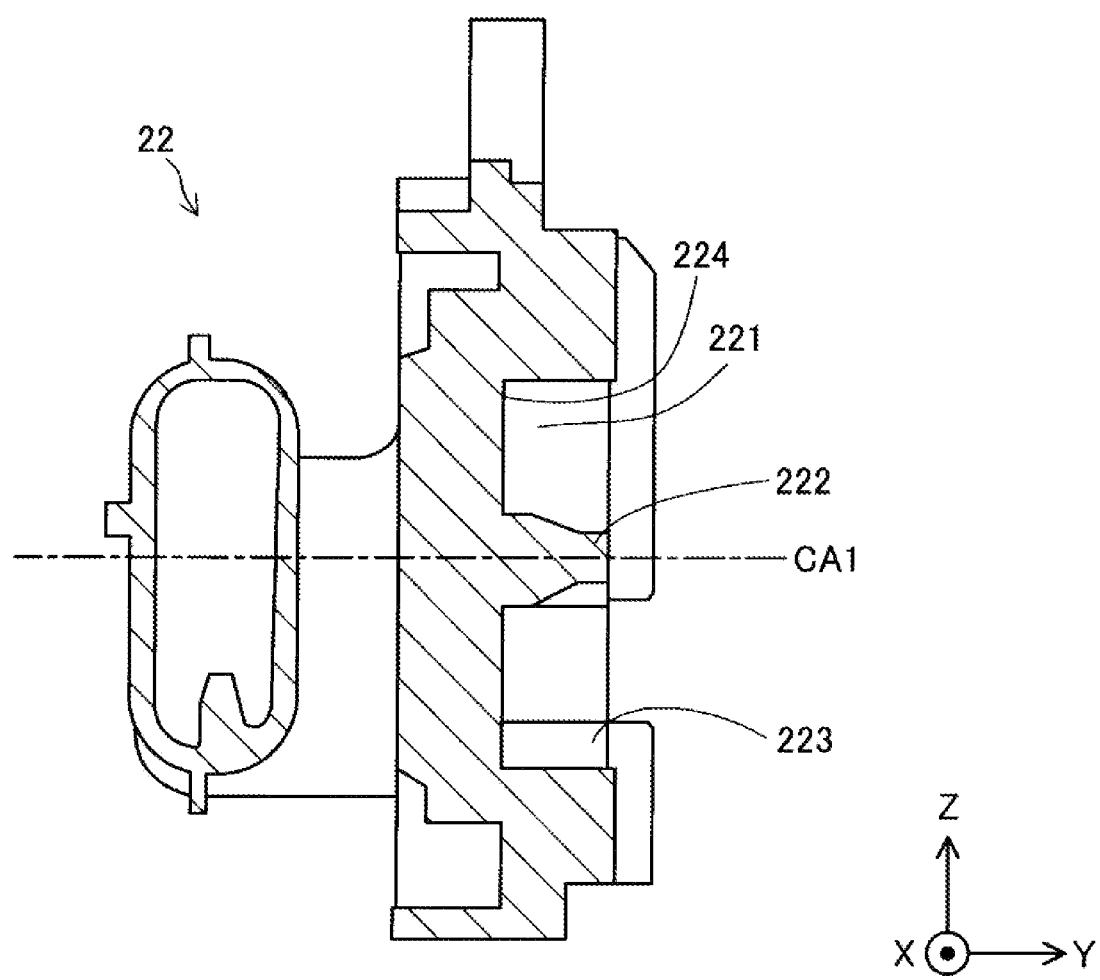
FIG. 5 is a cross-sectional view taken along a line V-V of FIG. 4.
Figure 6:
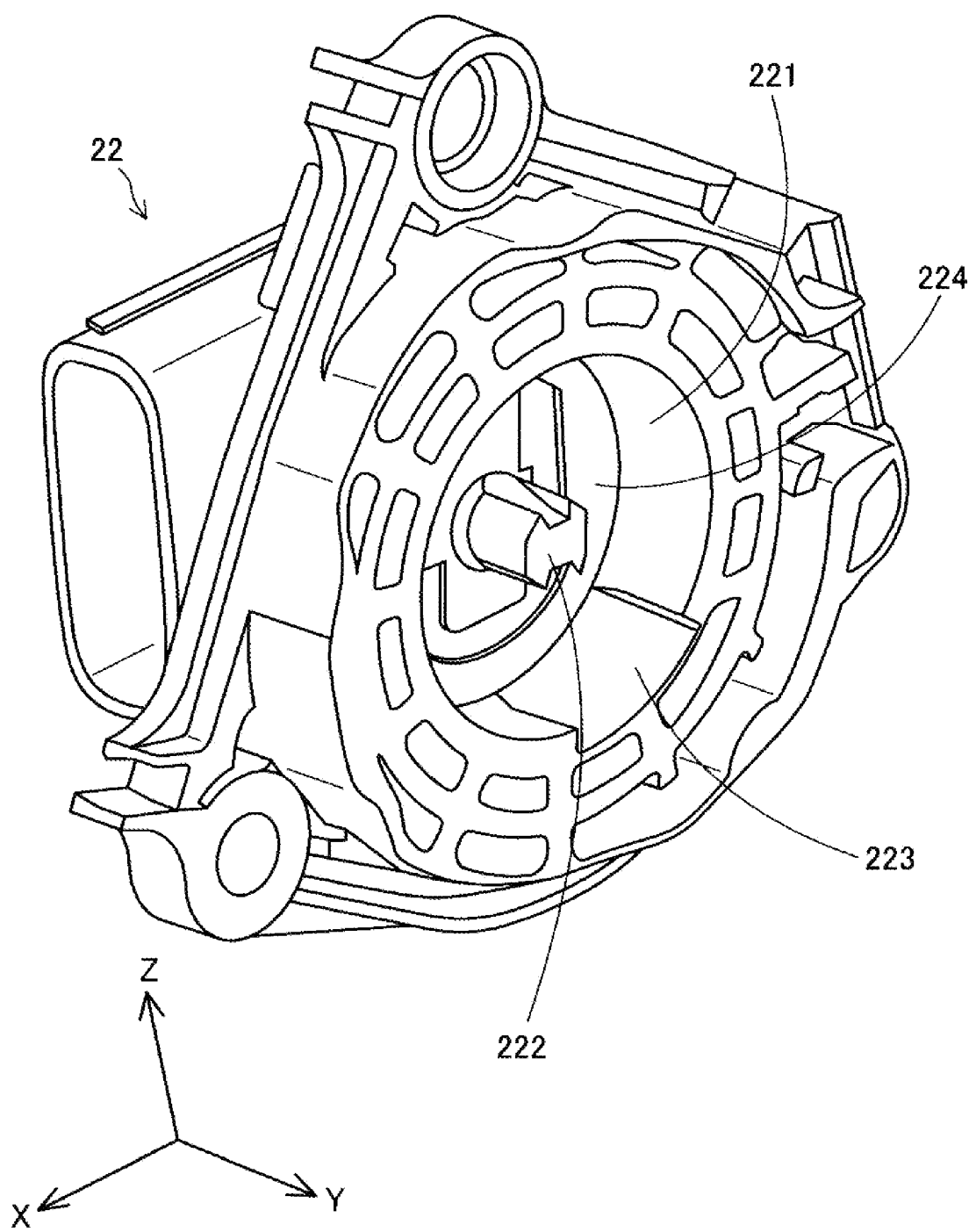
FIG. 6 is a perspective view for explaining a cover.

FIG. 4 shows a view of the cover 22 as seen from the internal accommodation space SP side. As shown in FIGS. 4 to 6, the cover 22 has a first bearing portion 221, a first fitting portion 222, a first groove portion 223, and a first surface 224. The first bearing portion 221 receives the first end 511 of the shaft 51. The first bearing portion 221 is a concave portion recessed from the positive direction side toward the negative direction side of the Y-axis. The first fitting portion 222 is fitted into the first shaft hole 511a provided in the first end 511. The shaft 51 is fixed to the cover 22 by fitting the first fitting portion 222 into the first shaft hole 511a.

The first groove portion 223 is a portion into which water that has flowed into the case portion 10 flows. As shown in FIG. 6, the first groove portion 223 is connected to the first bearing portion 221. The first groove portion 223 has a shape recessed downward with respect to the first surface 224. As shown in FIG. 5, the first groove portion 223 is provided below a central axis CA1 of the first surface 224 in the vertical direction. The first surface 224 is a surface of the first bearing portion 221 that faces the shaft 51.

Figure 7:
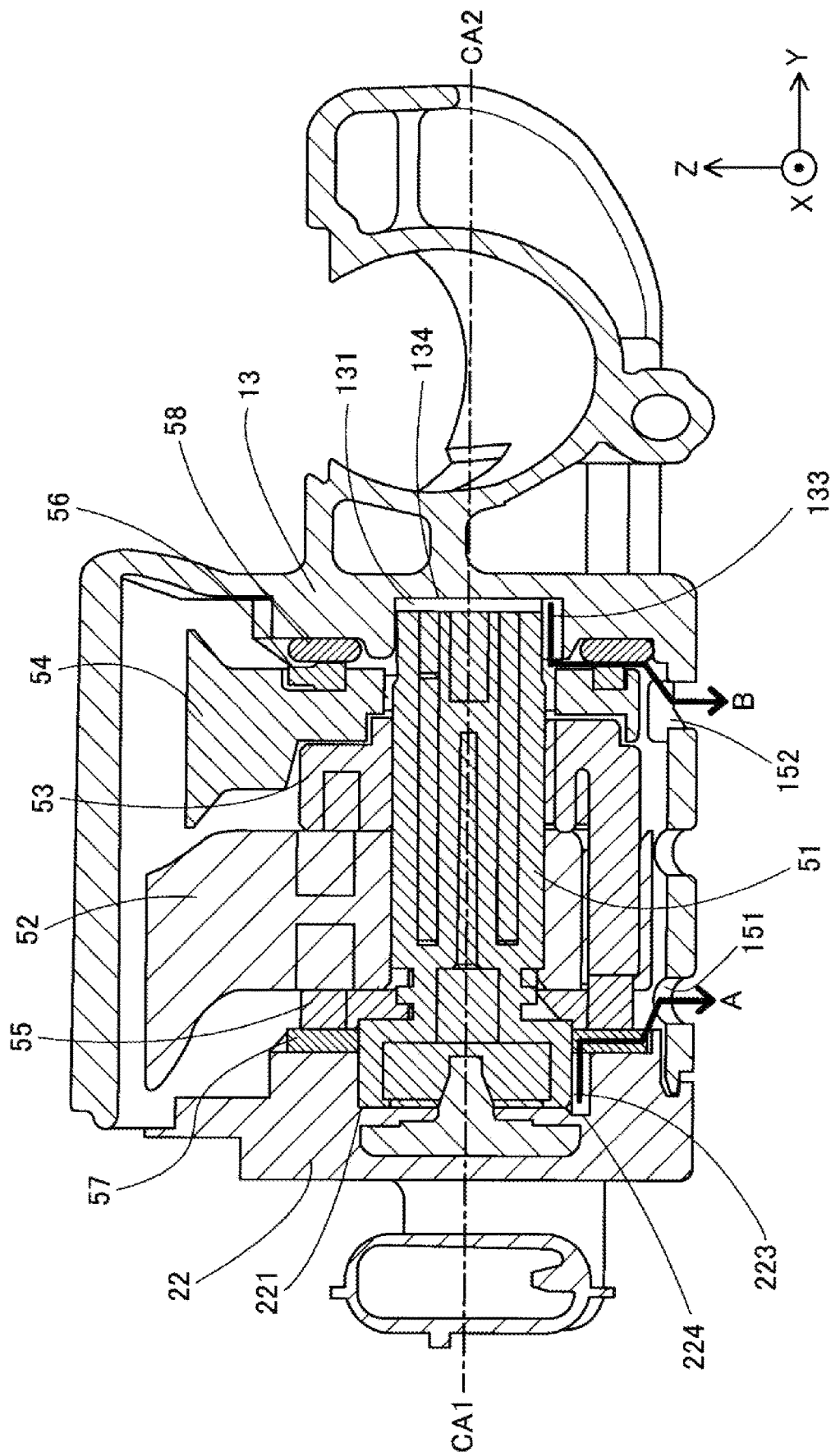
FIG. 7 is a diagram for explaining a function of a first groove portion and second groove portion.

FIG. 7 is a diagram showing a part of the VII-VII cross section of FIG. 1, and showing the case portion 10 and the internal movable mechanism 50. In addition, illustration of a part of the internal movable mechanism 50 is omitted. When water enters the inside of the case portion 10 from the opening 111, the water may enter between the first bearing portion 221 and the shaft 51. At this time, water flows into the first groove portion 223 located vertically downward from the central axis CA1 of the first surface 224. Therefore, water is less likely to remain in the first bearing portion 221. As a result, when water enters the inside of the case portion 10, it is possible to suppress from freezing of the shaft 51 and the first bearing portion 221. As a result, it is possible to prevent deterioration of operational feeling and generation of abnormal noise. As indicated by an arrow A in FIG. 7, the water that has flowed into the first groove portion 223 flows vertically downward from the first groove portion 223, and is discharged to the outside through a case hole 151 formed in the case portion 10 vertically downward from the first groove portion 223 and holes other than the case hole 151. As a result, it is possible to prevent the water that has flowed vertically downward from the first groove portion 223 from accumulating inside the case portion 10.

Figure 8:
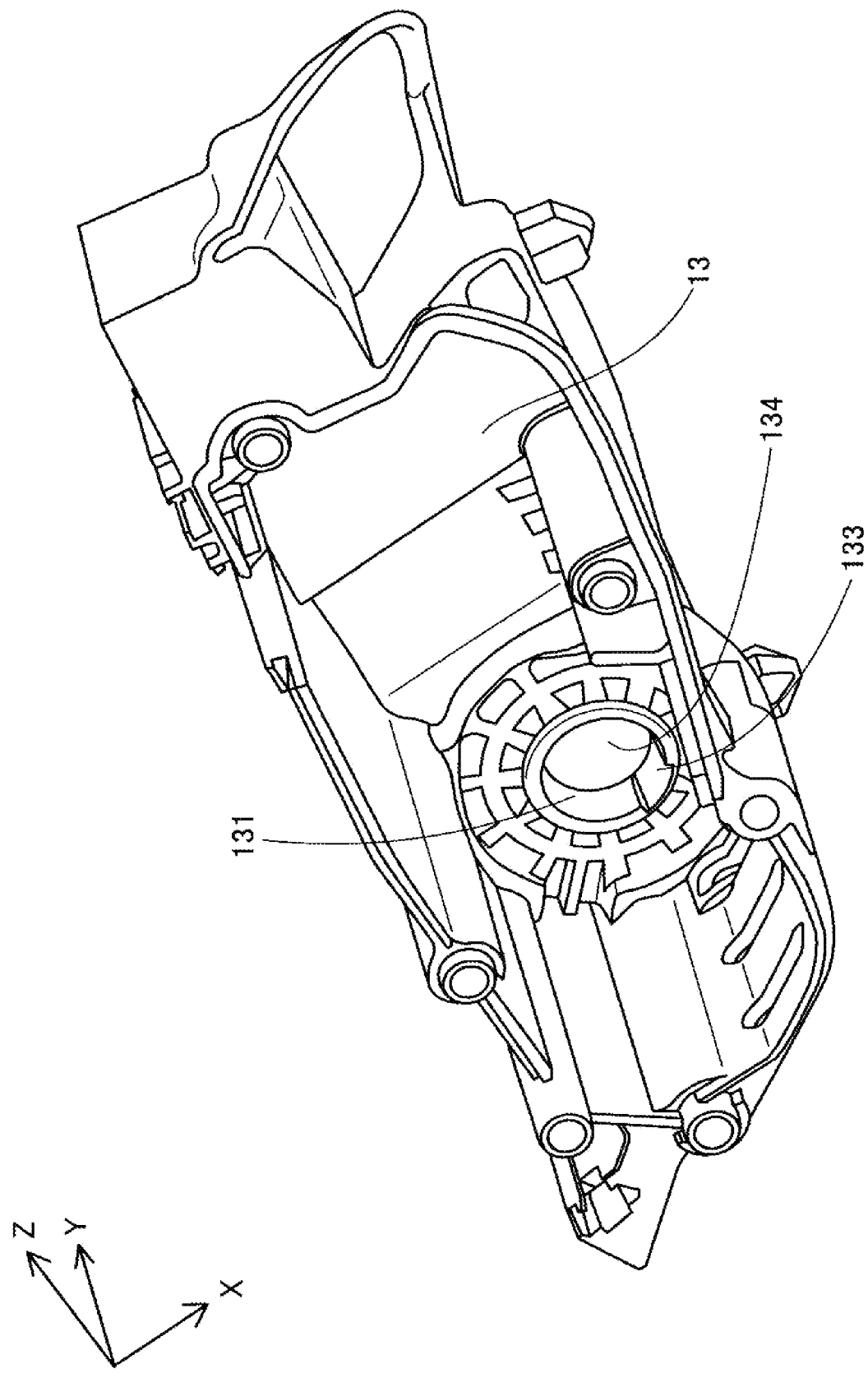
FIG. 8 is a perspective view of a case portion excluding a first side wall.
Figure 9:
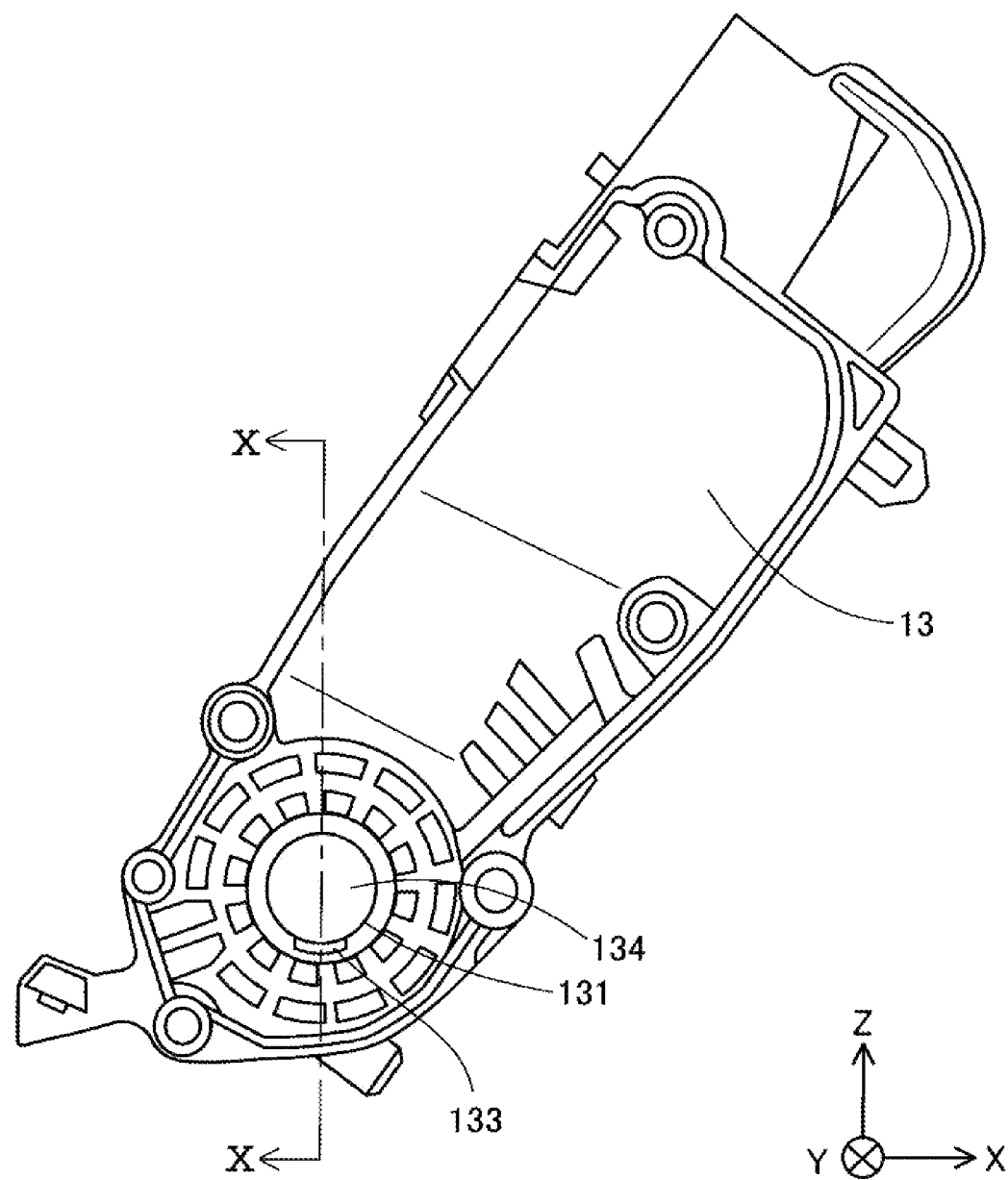
FIG. 9 is a side view of the case portion excluding the first side wall.
Figure 10:
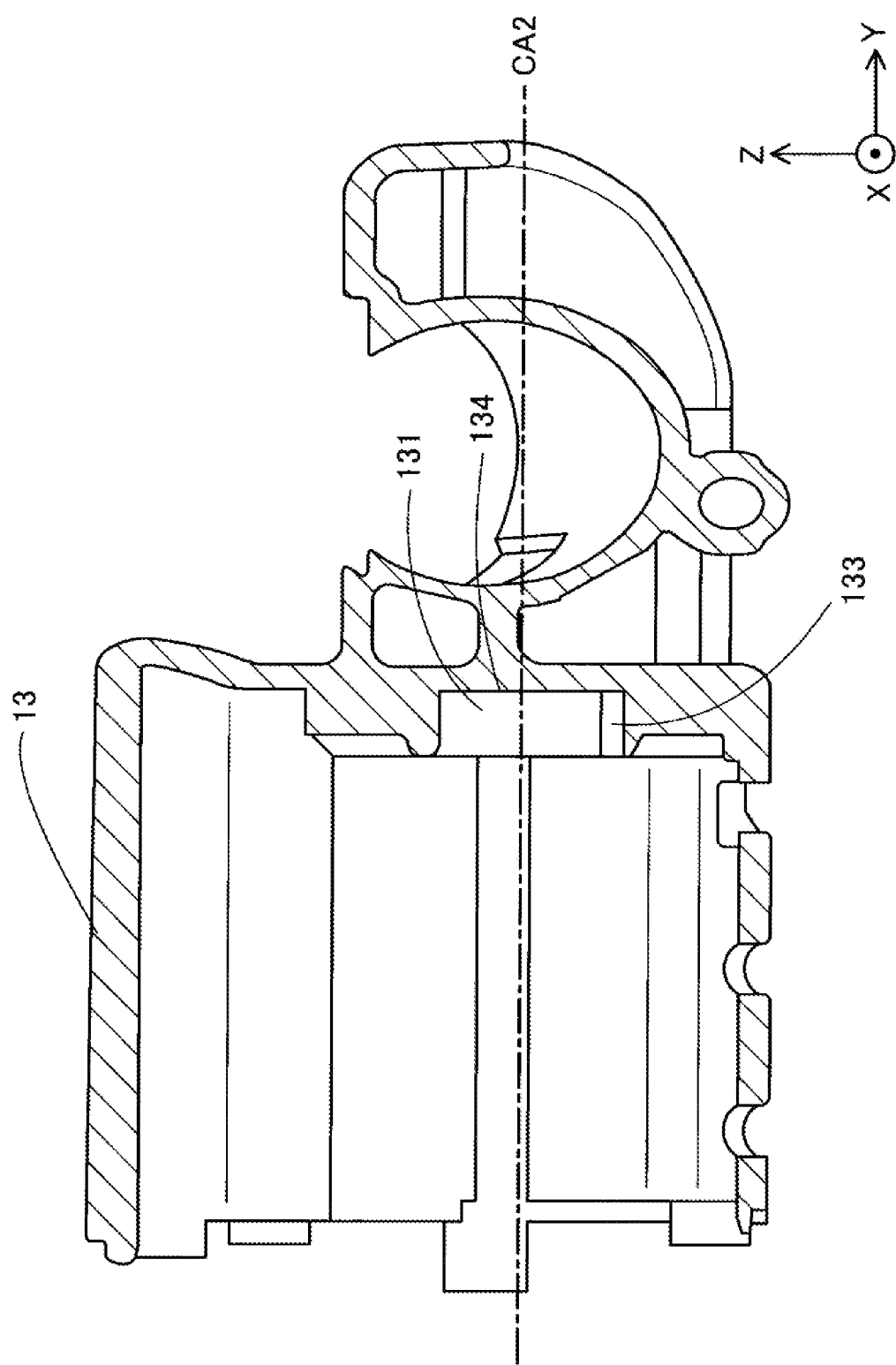
FIG. 10 is a cross-sectional view taken along a line X-X of FIG. 9.

FIG. 9 shows a view of the second side wall 13 as seen from the internal accommodation space SP side. As shown in FIGS. 8 to 10, the second side wall 13 of the case portion 10 has a second bearing portion 131, a second groove portion 133, and a second surface 134. The second bearing portion 131 receives a second end 512 of the shaft 51. The second bearing portion 131 is a concave portion that is recessed from the negative direction side toward the positive direction side of the Y-axis.

The second groove portion 133 is a portion into which water that has flowed into the case portion 10 flows. As shown in FIG. 8, the second groove portion 133 is connected to the second bearing portion 131. As shown in FIG. 10, the second groove portion 133 is provided below the central axis CA2 of the second surface 134 in the vertical direction. In the present embodiment, the central axis CA1 and the central axis CA2 are aligned. The same applies to the embodiments described later. The second groove portion 133 has a shape recessed downward with respect to the second surface 134. The second surface 134 is a surface of the second bearing portion 131 that faces the shaft 51.

When water enters the inside of the case portion 10 from the opening 111, the water may enter between the second bearing portion 131 and the shaft 51. At this time, water flows into the second groove portion 133 located vertically downward from the central axis CA2 of the second surface 134. Therefore, water is less likely to remain in the second bearing portion 131. As a result, when water enters the inside of the case portion 10, it is possible to suppress from freezing of the shaft 51 and the second bearing portion 131. As a result, it is possible to prevent deterioration of operational feeling and generation of abnormal noise. As indicated by an arrow B in FIG. 7, the water that has flowed into the second groove portion 133 flows vertically downward from the second groove portion 133, and is discharged to the outside through a case hole 152 formed in the case portion 10 vertically downward from the second groove portion 133 and holes other than the case hole 152. As a result, it is possible to prevent the water that has flowed vertically downward from the second groove portion 133 from accumulating inside the case portion 10.

B. Second Embodiment

Figure 11:
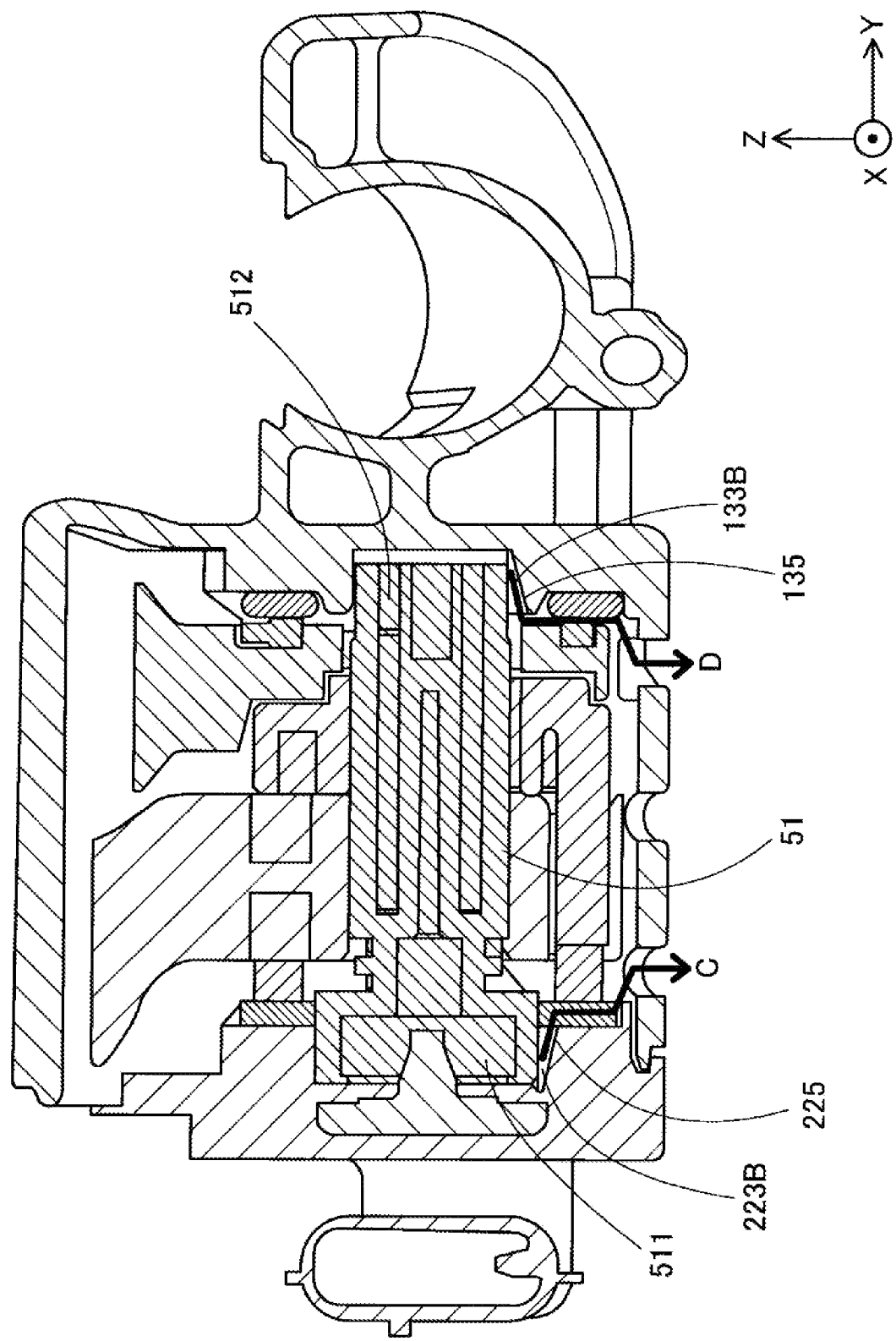
FIG. 11 is a diagram for explaining a second embodiment.
Figure 12:
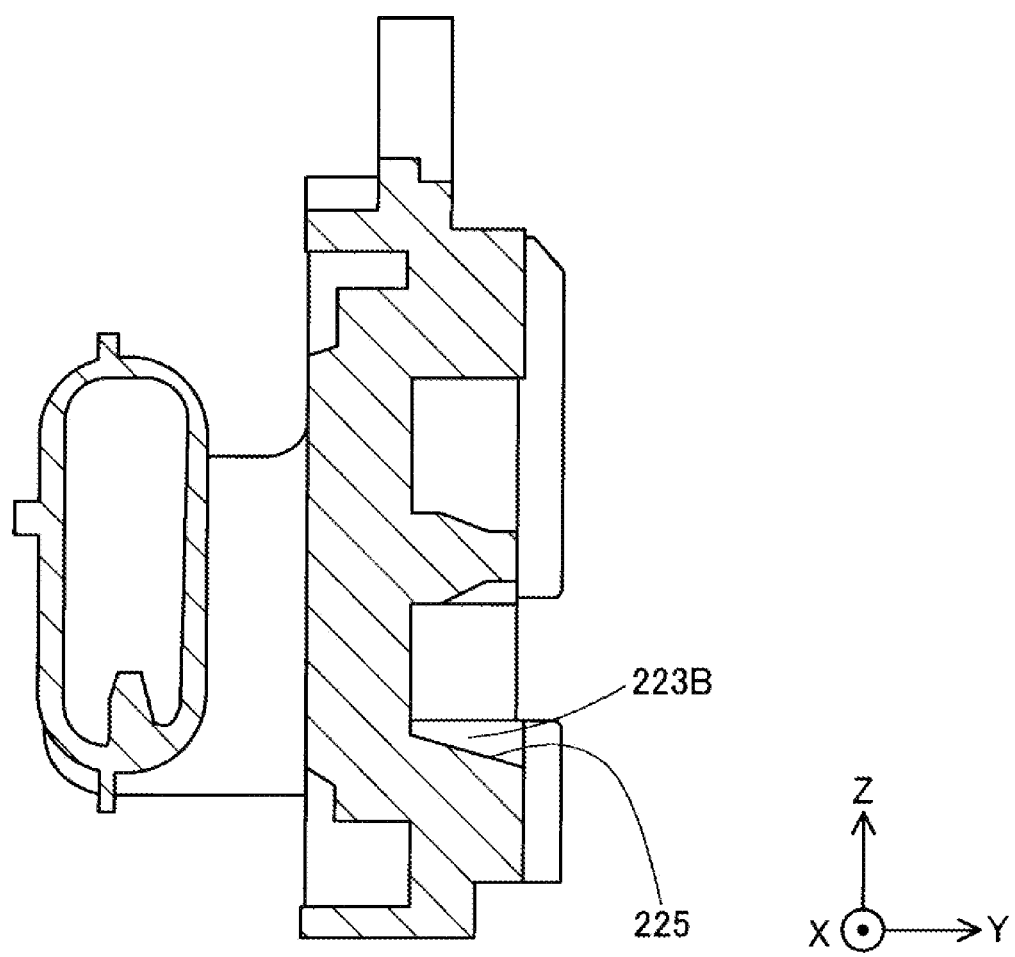
FIG. 12 is a diagram for explaining a cover of a second embodiment.
Figure 13:
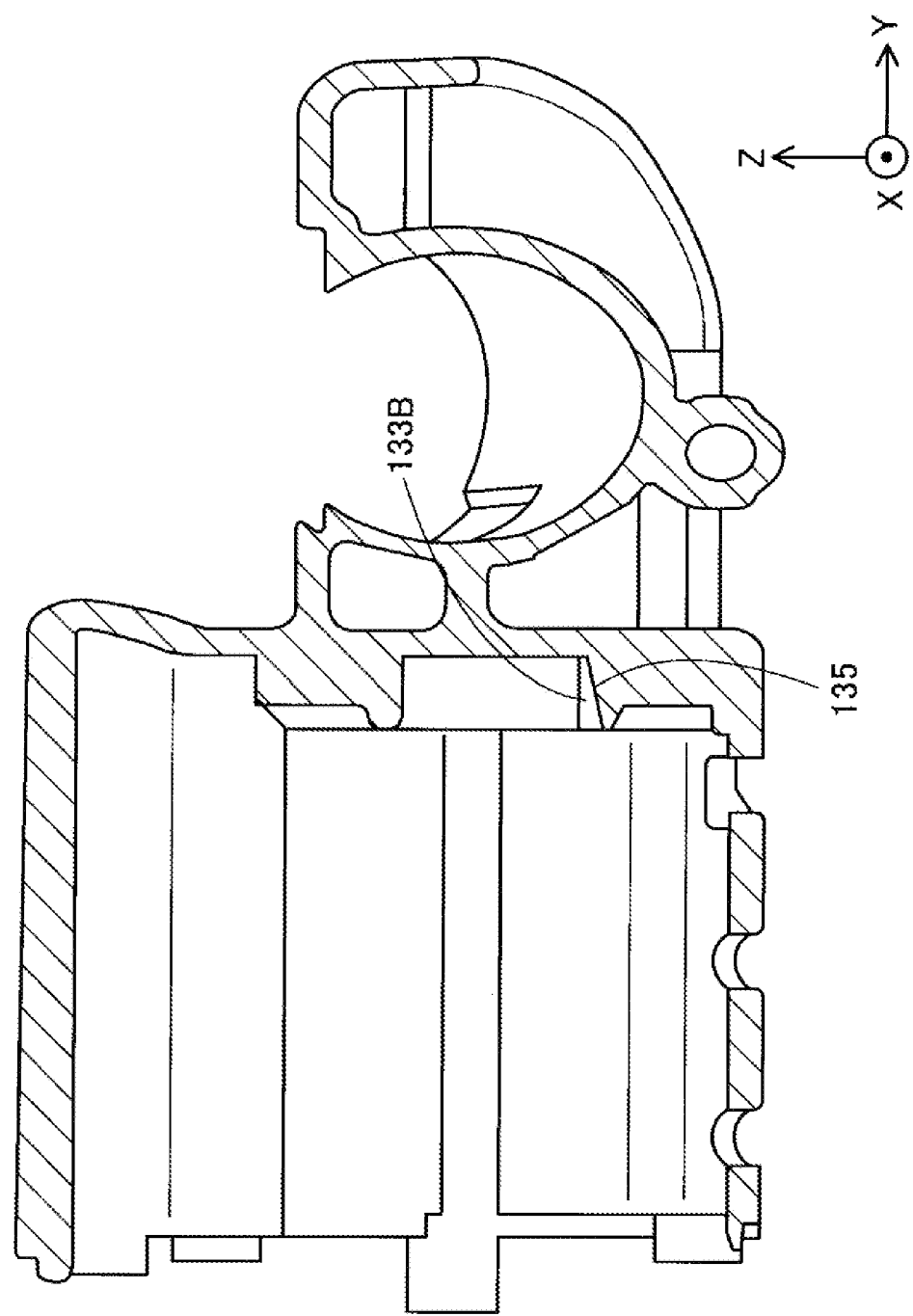
FIG. 13 is a diagram showing a case part other than a first side wall of the second embodiment.

As shown in FIGS. 11 to 13, in the second embodiment, the shapes of a first groove portion 223B and a second groove portion 133B are different from those in the first embodiment. Since other configurations of the second embodiment are the same as those of the first embodiment, the same reference numerals are given and detailed descriptions thereof are omitted.

FIG. 11 corresponds to FIG. 7. As shown in FIGS. 11 and 12, the first groove portion 223B has a first lower surface 225 which is a lower surface of the surfaces of the first groove portion 223B. The first lower surface 225 is a surface on the vertically downward side of the surfaces of the first groove portion 223B. The first lower surface 225 is inclined with respect to the Y-axis, which is a direction perpendicular to the Z-axis, which is a vertical direction. Specifically, as shown in FIG. 11, the first lower surface 225 is configured to descend along the direction from the first end 511 to the second end 512 of the shaft 51. In the second embodiment, as indicated by arrow C in FIG. 11, the water that has flowed into the first groove portion 223B tends to flow vertically downward, and the water is more likely to be discharged from the first groove portion 223B.

As shown in FIGS. 11 and 13, the second groove portion 133B has a second lower surface 135 which is the lower surface. The second lower surface 135 is a surface on the vertically downward side of the surfaces of the second groove portion 133B. The second lower surface 135 is inclined with respect to the Y-axis, which is a direction perpendicular to the Z-axis, which is a vertical direction. Specifically, the second lower surface 135 is configured to descend along a draft direction from the second end 512 of the shaft 51 toward the first end 511. In the second embodiment, as indicated by arrow D in FIG. 11, the water that has flowed into the second groove portion 133B tends to flow vertically downward, and the water is more likely to be discharged from the second groove portion 133B.

C. Third Embodiment

Figure 14:
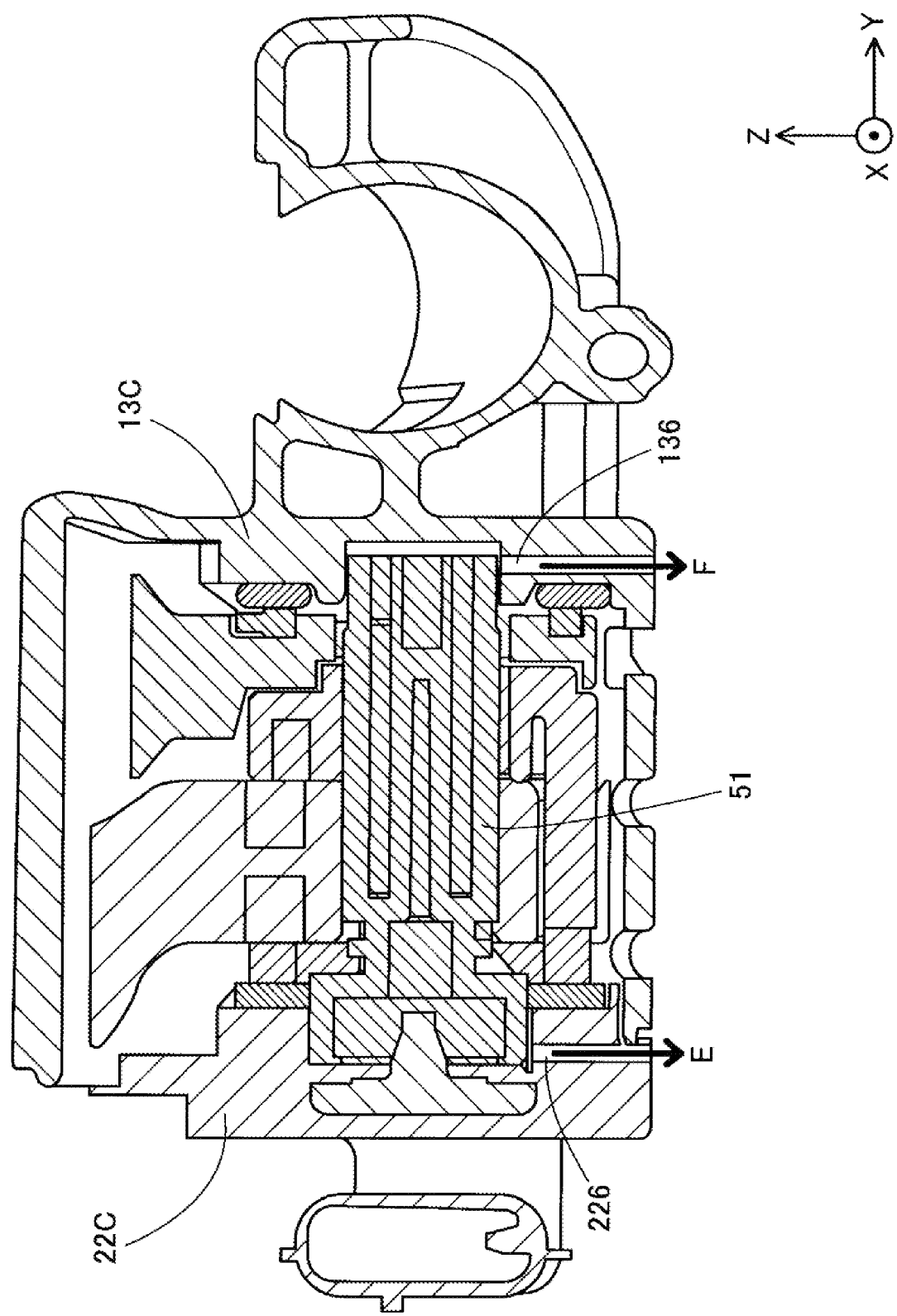
FIG. 14 is a diagram for explaining a third embodiment.
Figure 15:
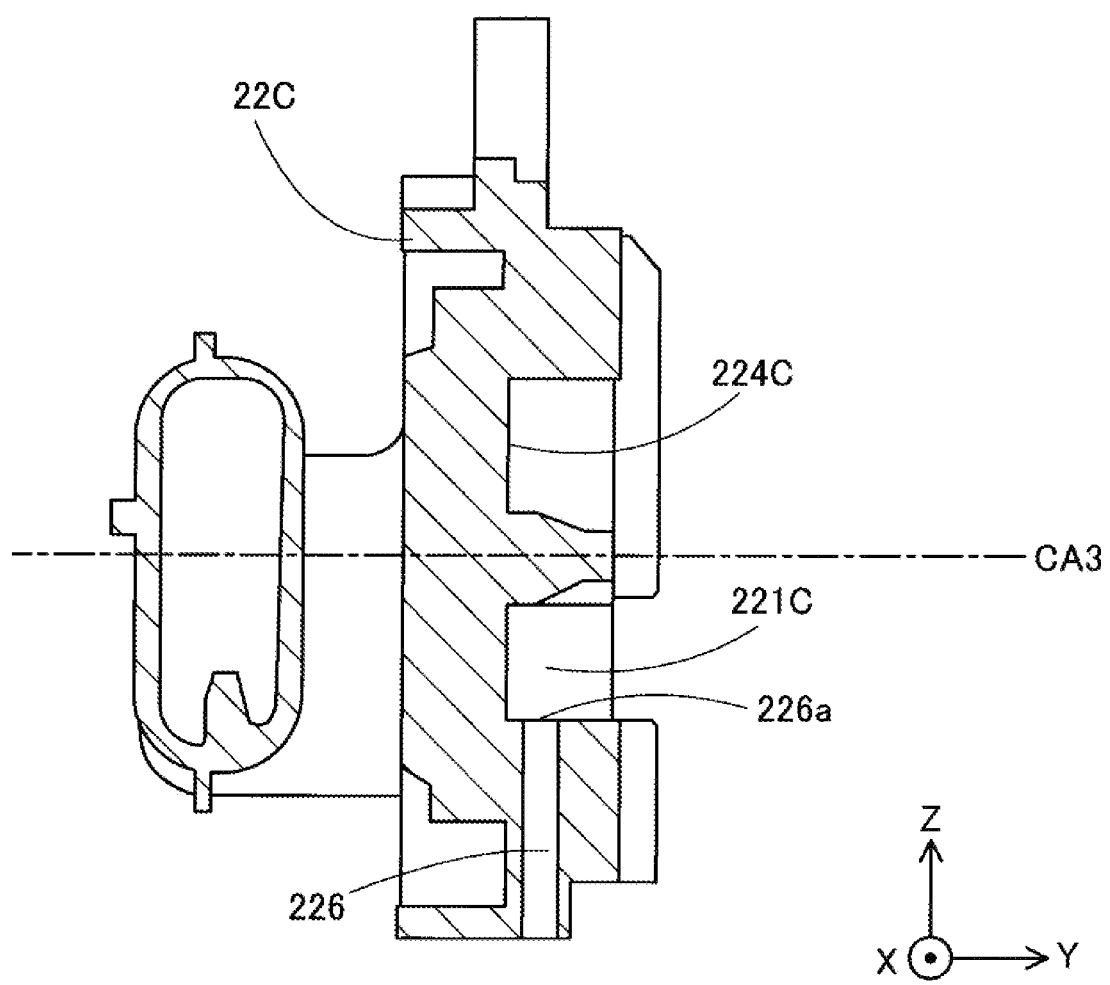
FIG. 15 is a diagram for explaining a cover of a third embodiment.

In the third embodiment, the first groove portions 223 and 223B are not formed in the cover 22C of the first side wall 20, but a first passage 226 is formed, and the second groove portions 133 and 133B are not formed in the second side wall 13C, but a second passage 136 is formed. In this respect, the third embodiment differs from the above embodiment. Since other configurations are the same as those of the above-described embodiment, the same reference numerals are given and detailed descriptions thereof are omitted. As shown in FIGS. 14 and 15, the cover 22C has the first passage 226.

The first passage 226 discharges the water in the first bearing portion 221C to the outside by communicating the first bearing portion 221C with the outside of the cover 22C. As shown in FIG. 15, the first passage 226 is provided vertically below the central axis CA3 of the first surface 224C. The first passage 226 has a first opening 226a, which is an opening. The first opening 226a connects with the first bearing portion 221C. As indicated by arrow E in FIG. 14, water in the first bearing portion 221C flows into the first passage 226 through the first opening 226a. The first passage 226 is arranged below the first opening 226a in the vertical direction.

Figure 16:
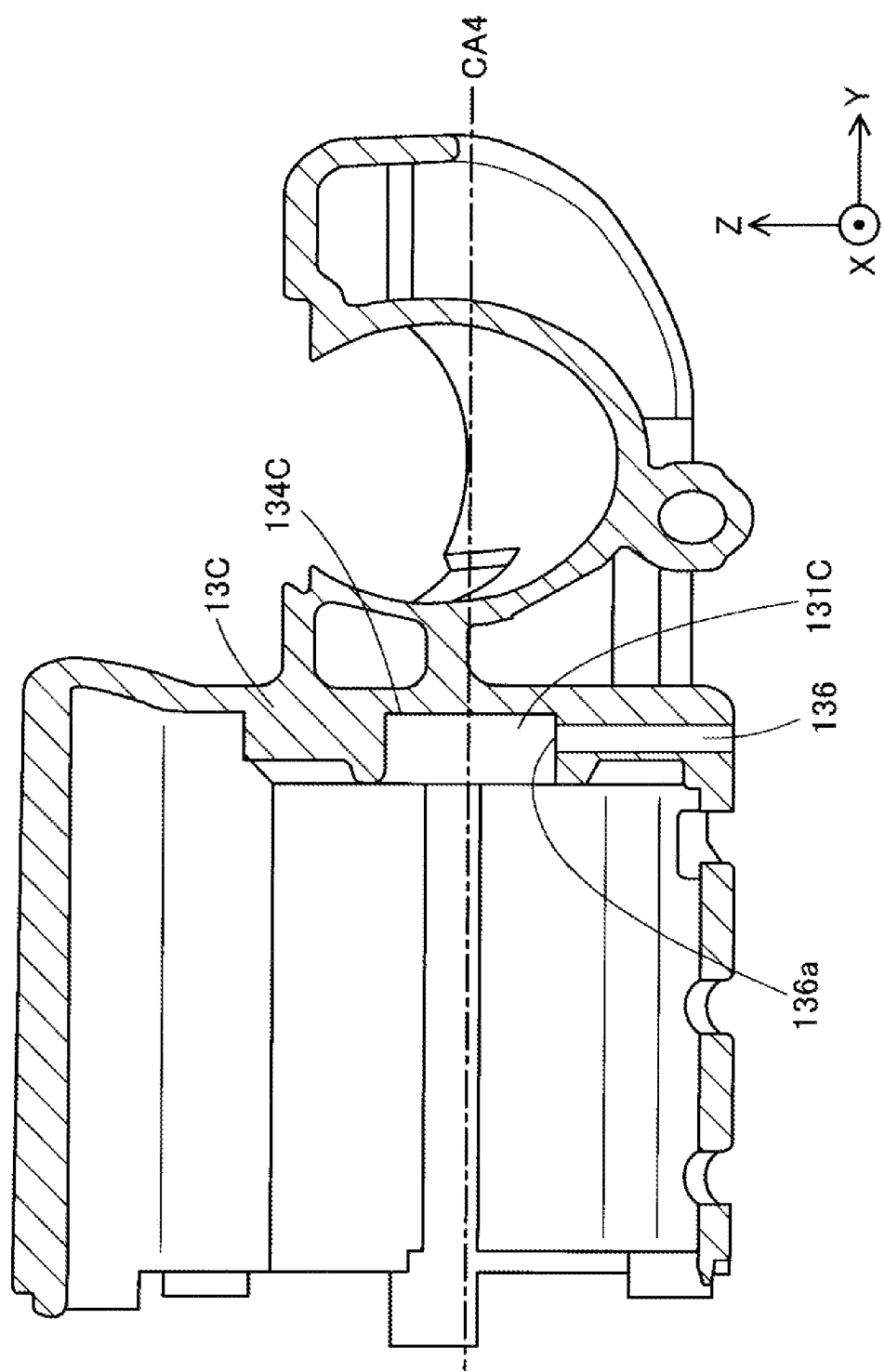
FIG. 16 is a diagram showing a case part other than a first side wall of the third embodiment.

As shown in FIGS. 14 and 16, the second side wall 13C has a second passage 136. The second passage 136 discharges the water in the second bearing portion 131C to the outside by communicating the second bearing portion 131C with the outside of the case portion 10. The second passage 136 is provided below the central axis CA4 of the second surface 134C in the vertical direction. The second passage 136 has a second opening 136a, which is an opening. The second opening 136a connects with the second bearing portion 131C. As indicated by arrow F in FIG. 14, water in the second bearing portion 131C flows into the second passage 136 through the second opening 136a. The second passage 136 is arranged below the second opening 136a in the vertical direction. Water that has passed through the first passage 226 or the second passage 136 is discharged to the outside of the case portion 10.

In the third embodiment, when water enters the inside the case portion 10 through the opening 111, the water is discharged to the outside of the case portion 10 through the first passage 226 and the second passage 136. As a result, when water enters the inside of the case portion 10, it is possible to suppress freezing the shaft 51, the first bearing portion 221C, and the second bearing portion 131C, and to prevent deterioration of operational feeling and generation of abnormal noise. In addition, in the third embodiment, since the first passage 226 and the second passage 136 communicate with the outside, the water flowing between the case portion 10 and the shaft 51 can be reliably discharged to the outside of the case portion 10.

D. Fourth Embodiment

In the fourth embodiment, the shapes of a shaft 51D, a cover 22D, and a second side wall 13D are different from those in the above embodiments. Since other configurations are the same as those of the above-described embodiment, the same reference numerals are given and detailed descriptions thereof are omitted.

Figure 17:
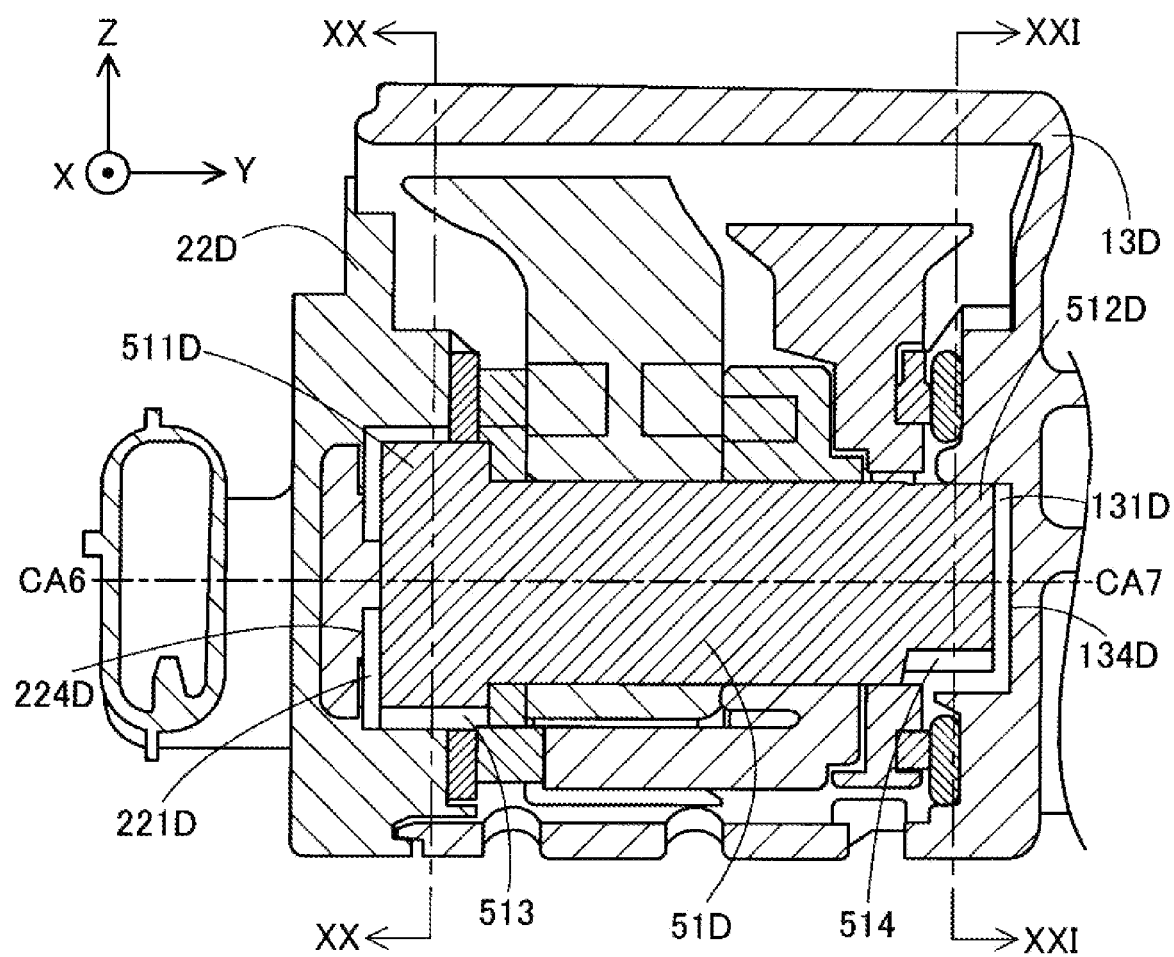
FIG. 17 is a diagram for explaining a fourth embodiment.
Figure 18:
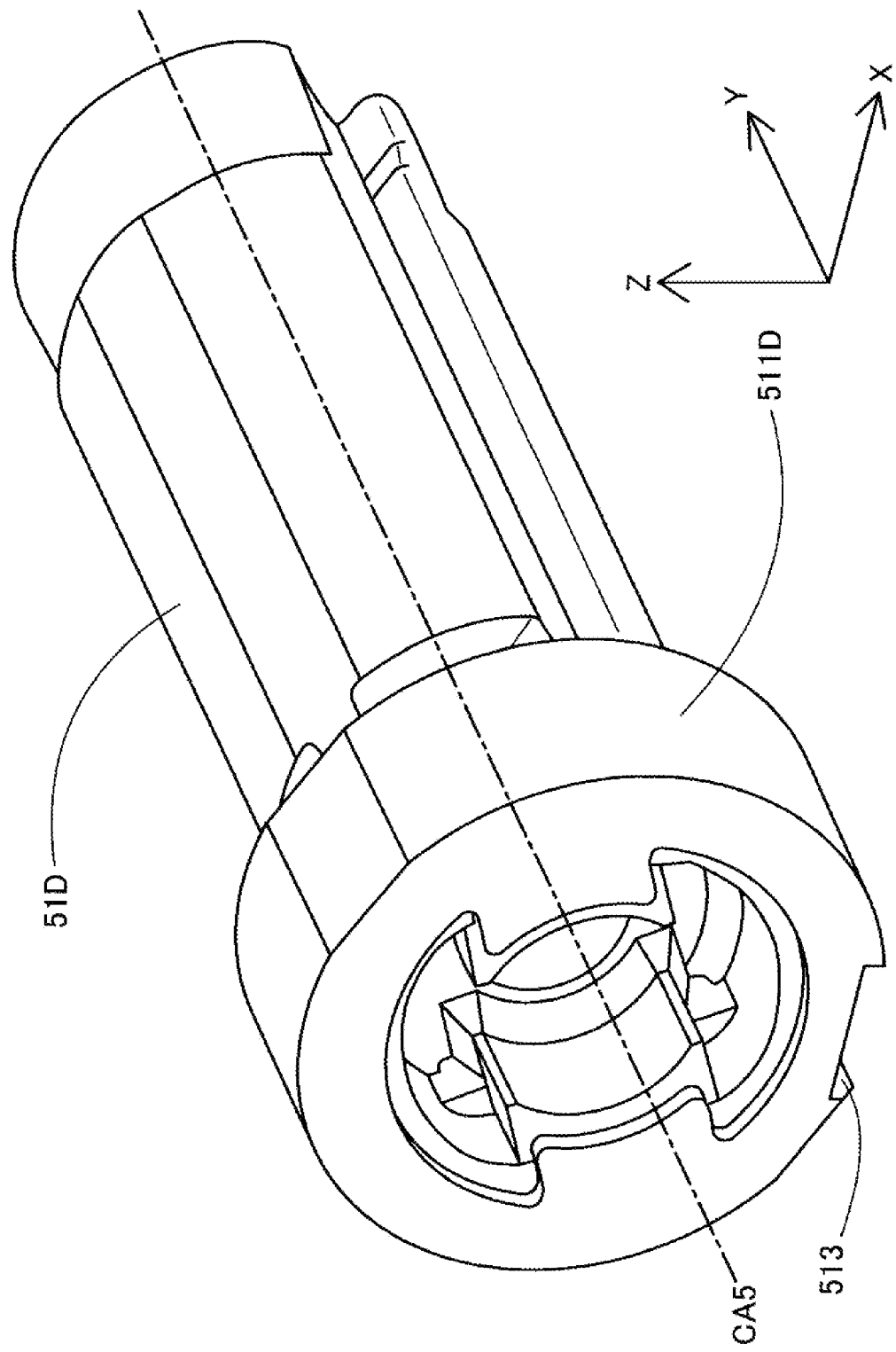
FIG. 18 is a diagram for explaining a shape of the shaft of the fourth embodiment.
Figure 19:
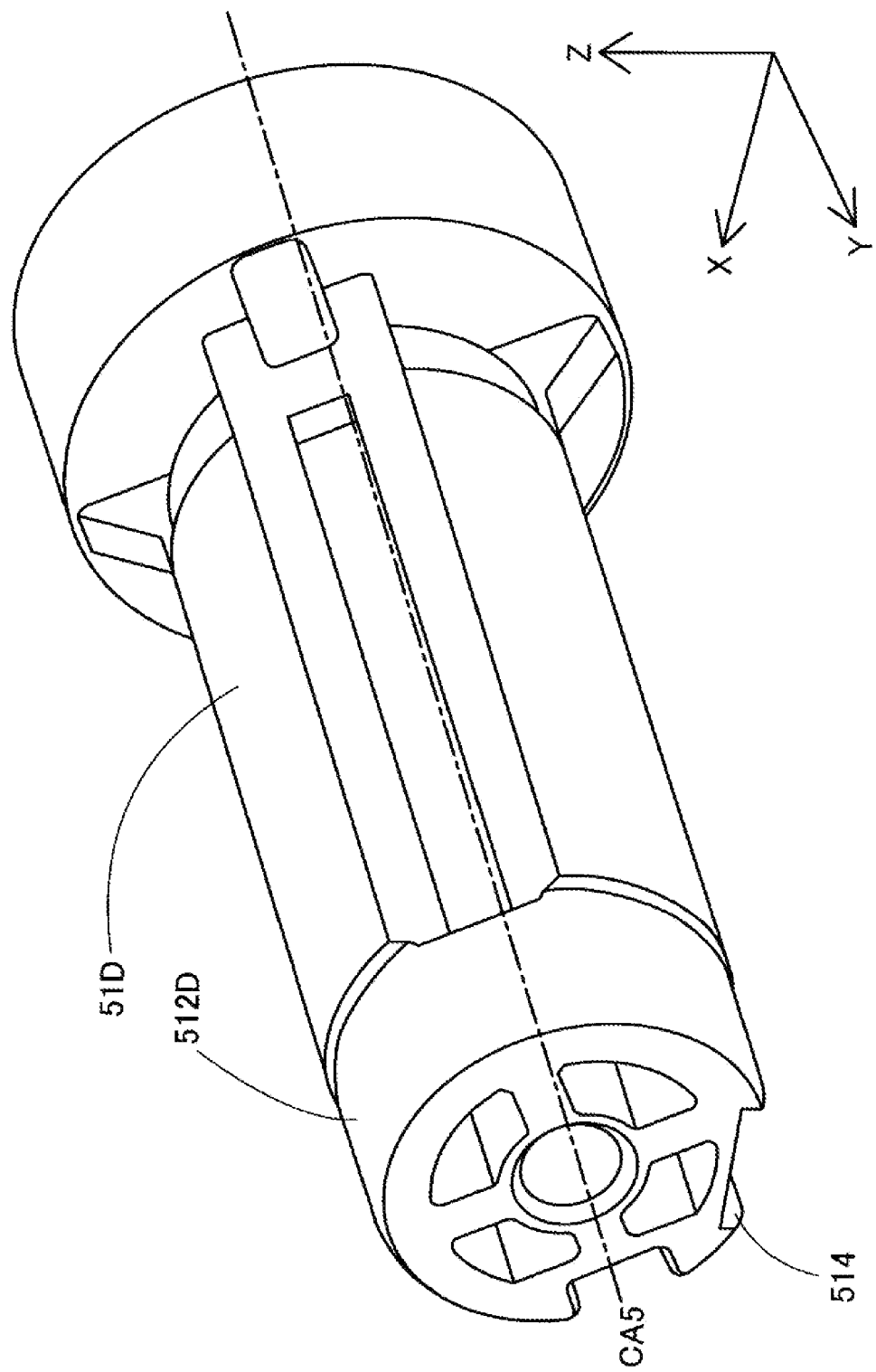
FIG. 19 is a diagram for explaining the shape of the shaft of the fourth embodiment.
Figure 20:
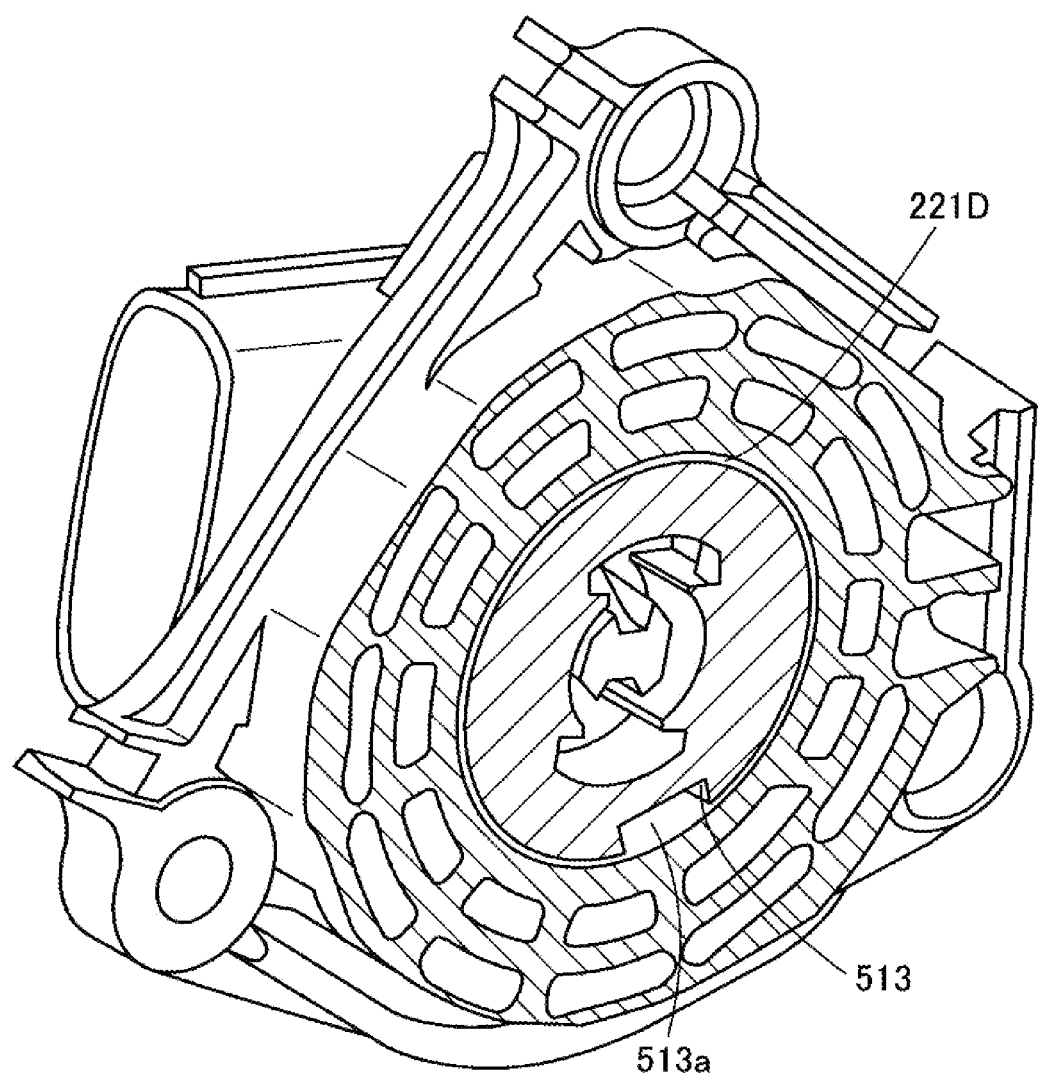
FIG. 20 is a cross-sectional view taken along the line XX-XX of FIG. 17 for explaining the first shaft groove.
Figure 21:
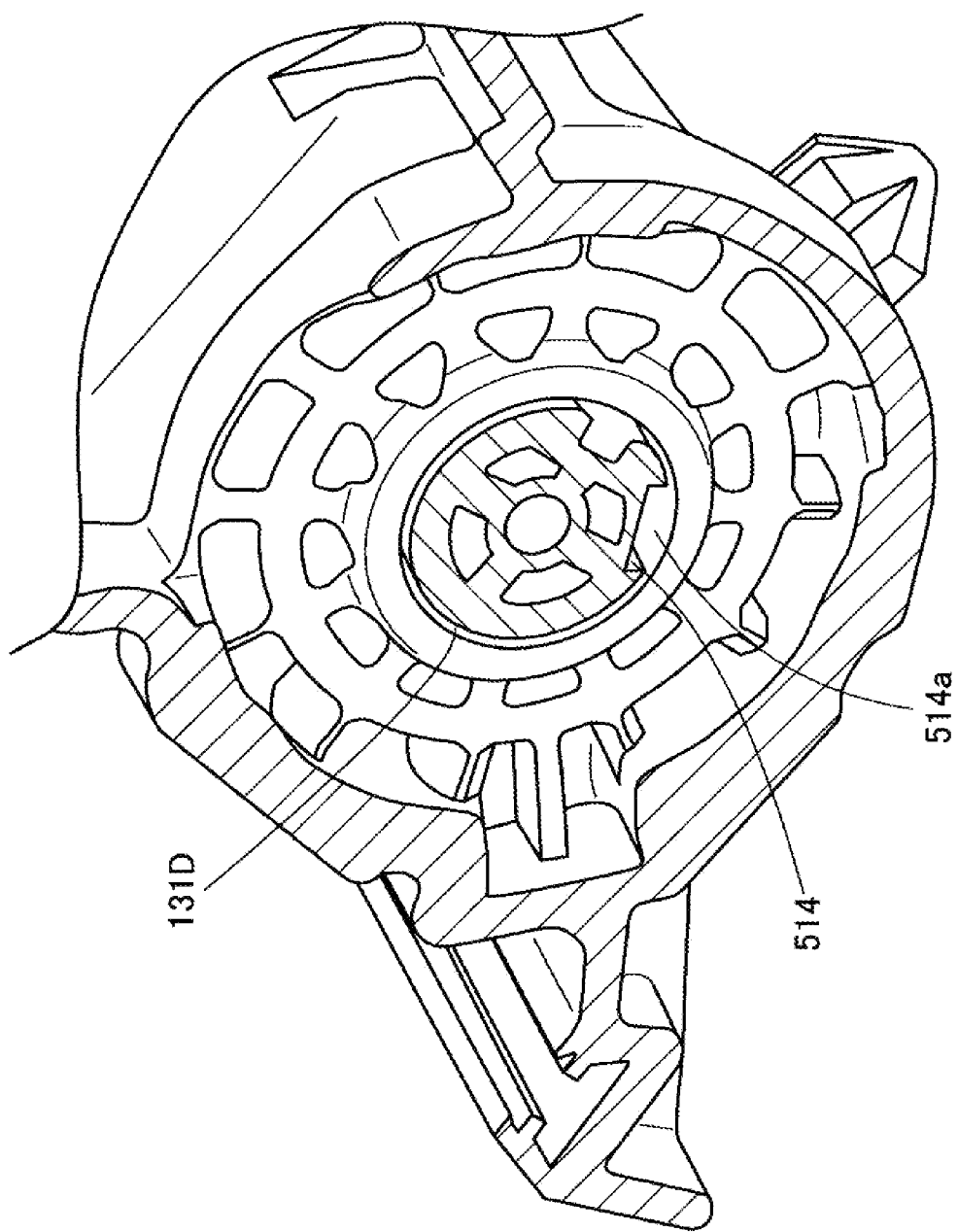
FIG. 21 is a cross-sectional view taken along the line XXI-XXI of FIG. 17 for explaining the second shaft groove.

As shown in FIGS. 17, 18 and 20, in the fourth embodiment, the first groove portions 223, 223B or the first passage 226 are not provided in the cover 22D of the first side wall 20 unlike the above embodiments. Further, as shown in FIGS. 17, 19 and 21, the second groove portions 133, 133B or the second passage 136 are not provided in the second side wall 13D.

FIG. 18 is a diagram for explaining the first end portion 511D of the shaft 51D. As shown in FIGS. 17 and 18, the shaft 51D has a first shaft groove 513. The first shaft groove 513 is a portion into which water flows between the cover 22D and the shaft 51D. The first shaft groove 513 is recessed toward the central axis CA5 direction of the shaft 51. The first shaft groove 513 extends to the outside of the first bearing portion 221D along the central axis CA5 of the shaft 51D. The outside of the first bearing portion 221D refers to the side of the second end portion 512D with respect to the cover 22D. The first shaft groove 513 is formed on the portion of the shaft 51D positioned inside the first bearing portion 221D. The first shaft groove 513 is provided on the outer peripheral surface of the shaft 51D. The first shaft groove 513 is provided vertically below the central axis CA6 of the first surface 224D, which is the surface of the first bearing portion 221D facing the shaft 51D, in both the fully opened and fully closed states of the accelerator.

FIG. 19 is a diagram for explaining the second end portion 512D of the shaft 51D. As shown in FIGS. 17 and 19, the shaft 51D has a second shaft groove 514. The second shaft groove 514 is a portion into which water flows between the second side wall 13D and the shaft 51D. The second shaft groove 514 is recessed toward the central axis CA5 of the shaft 51D. The second shaft groove 514 extends to the outside of the second bearing portion 131D along the central axis CA5 direction of the shaft 51D. The outside of the second bearing portion 131D refers to the side of the first end portion 511D of the shaft 51D with respect to the second side wall 13D. The second shaft groove 514 is formed on the portion of the shaft 51D located inside the second bearing portion 131D. The second shaft groove 514 is provided on the outer peripheral surface of the shaft 51D. The second shaft groove 514 is provided vertically below the central axis CA7 of the second surface 134D, which is the surface of the second bearing portion 131D facing the shaft 51D, in both the fully opened and fully closed states of the accelerator.

As shown in FIG. 20, a gap 513a is formed between the first shaft groove 513 and the first bearing portion 221D by providing the first shaft groove 513. Further, as shown in FIG. 21, a gap 514a is formed between the second shaft groove 514 and the second bearing portion 131D by providing the second shaft groove 514. As a result, when water enters the inside of the case portion 10 from the opening 111, the water flows through the gaps 513a and 514a, and water hardly remains between the shaft 51D and the first bearing portion 221D and between the shaft 51D and the second bearing portion 131D. As a result, when water enters the inside of the case portion 10, it is possible to suppress freezing the shaft 51D, the first bearing portion 221D, and the second bearing portion 131D, and to prevent deterioration of operational feeling and generation of abnormal noise. The water that has flowed into the gaps 513a and 514a then flows vertically downward and is discharged to the outside through holes formed in the case portion 10.

E. Fifth Embodiment

In the fifth embodiment, the shape of the shaft 51E is different from that in the fourth embodiment. Since other configurations are the same as those of the fourth embodiment, the same reference numerals as those of the fourth embodiment are given and detailed descriptions thereof are omitted.

Figure 22:
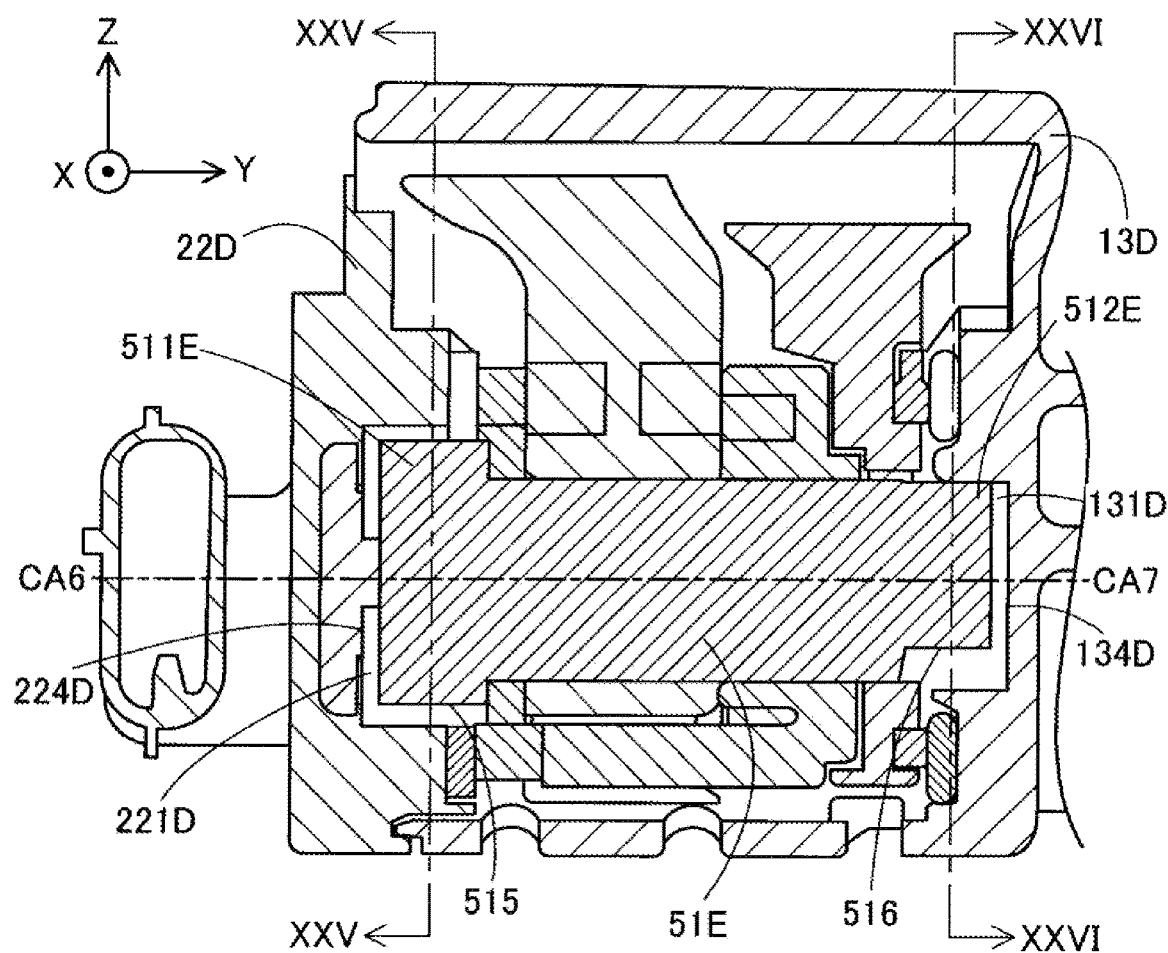
FIG. 22 is a diagram for explaining the shape of the shaft of a fifth embodiment.
Figure 23:
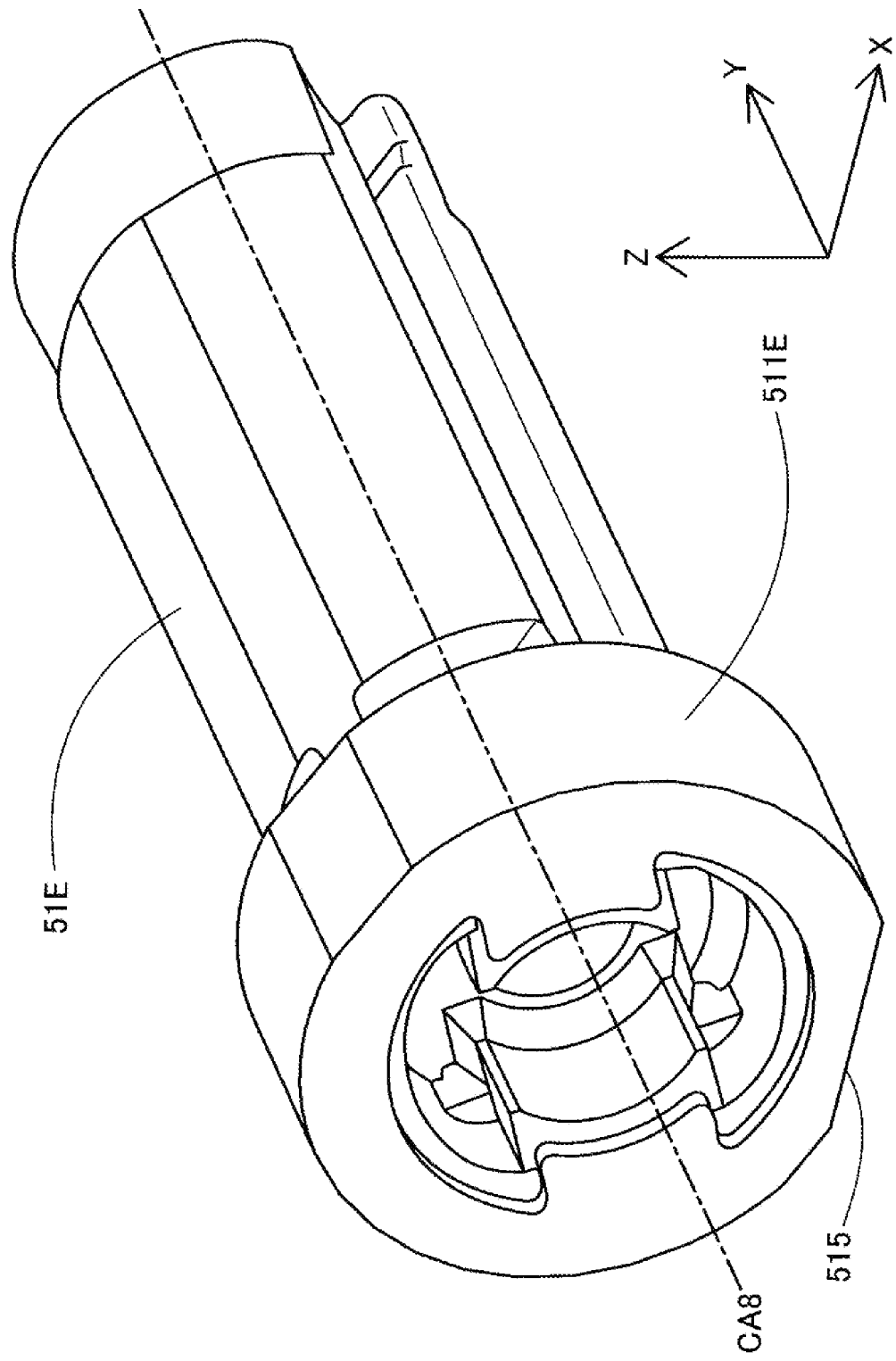
FIG. 23 is a diagram for explaining the shape of the shaft of the fifth embodiment.

As shown in FIGS. 22 and 23, the shaft 51E has a first plane 515. The first plane 515 is formed on the outer peripheral surface of the first end 511E of the shaft 51E. The first plane 515 is a plane parallel to the central axis CA8 direction of the shaft 51E. As shown in FIG. 22, the first plane 515 extends to the outside of the first bearing portion 221D. The first plane 515 is provided vertically below the central axis CA6 of the first surface 224D, which is the surface of the first bearing portion 221D facing the shaft 51E, in both the fully opened and fully closed states of the accelerator.

Figure 24:
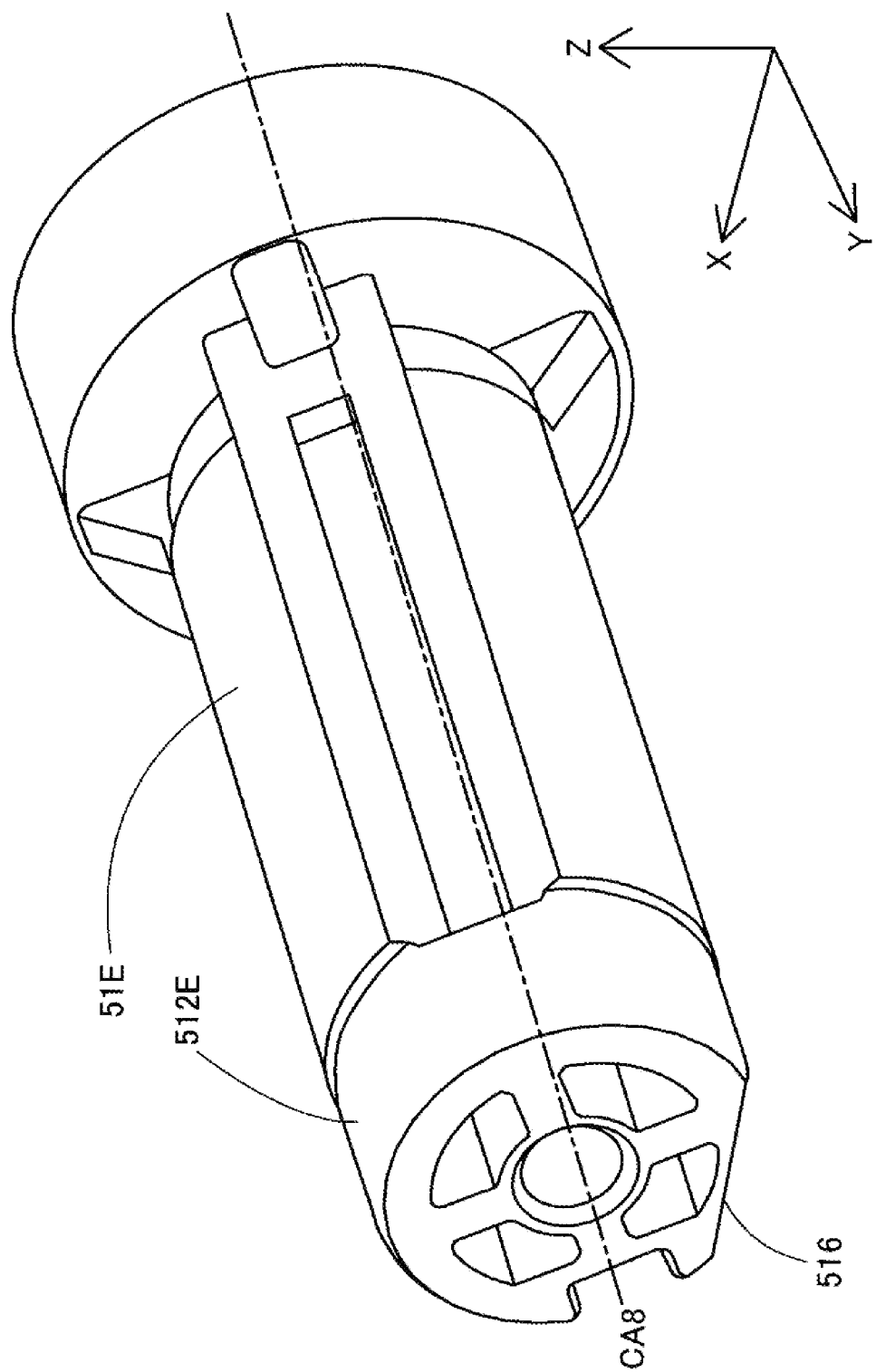
FIG. 24 is a diagram for explaining the shape of the shaft of the fifth embodiment.

As shown in FIGS. 22 and 24, a second plane 516 is formed on the shaft 51E. The second plane 516 is formed on the outer peripheral surface of the second end 512E of the shaft 51E. As shown in FIG. 22, the second plane 516 is a plane parallel to the central axis CA8 direction of the shaft 51E. The second plane 516 extends to the outside of the second bearing portion 131D. The second plane 516 is provided vertically below the central axis CA7 of the second surface 134D, which is the surface of the second bearing portion 131D facing the shaft 51E.

Figure 25:
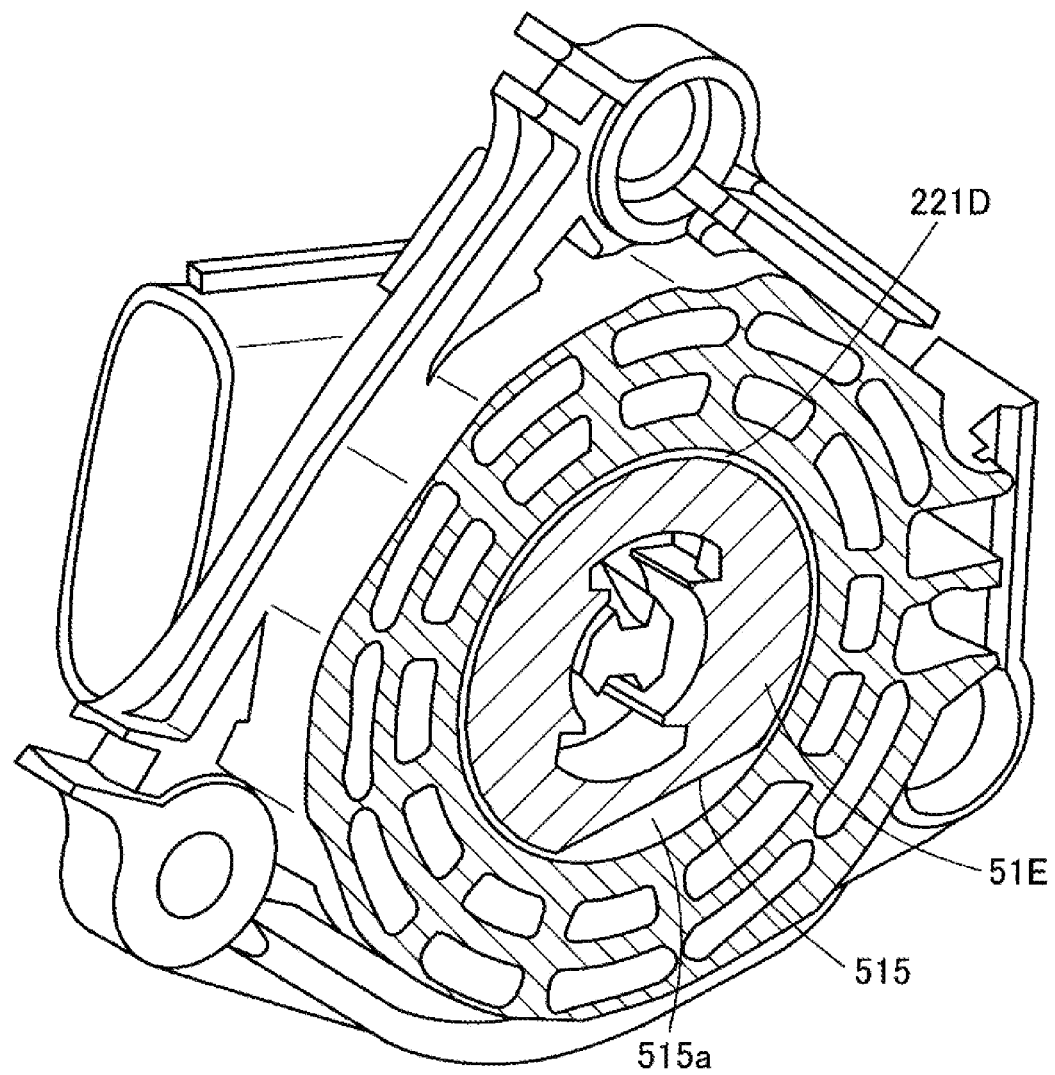
FIG. 25 is a cross-sectional view taken along line XXV-XXV of FIG. 22 for explaining a first plane.
Figure 26:
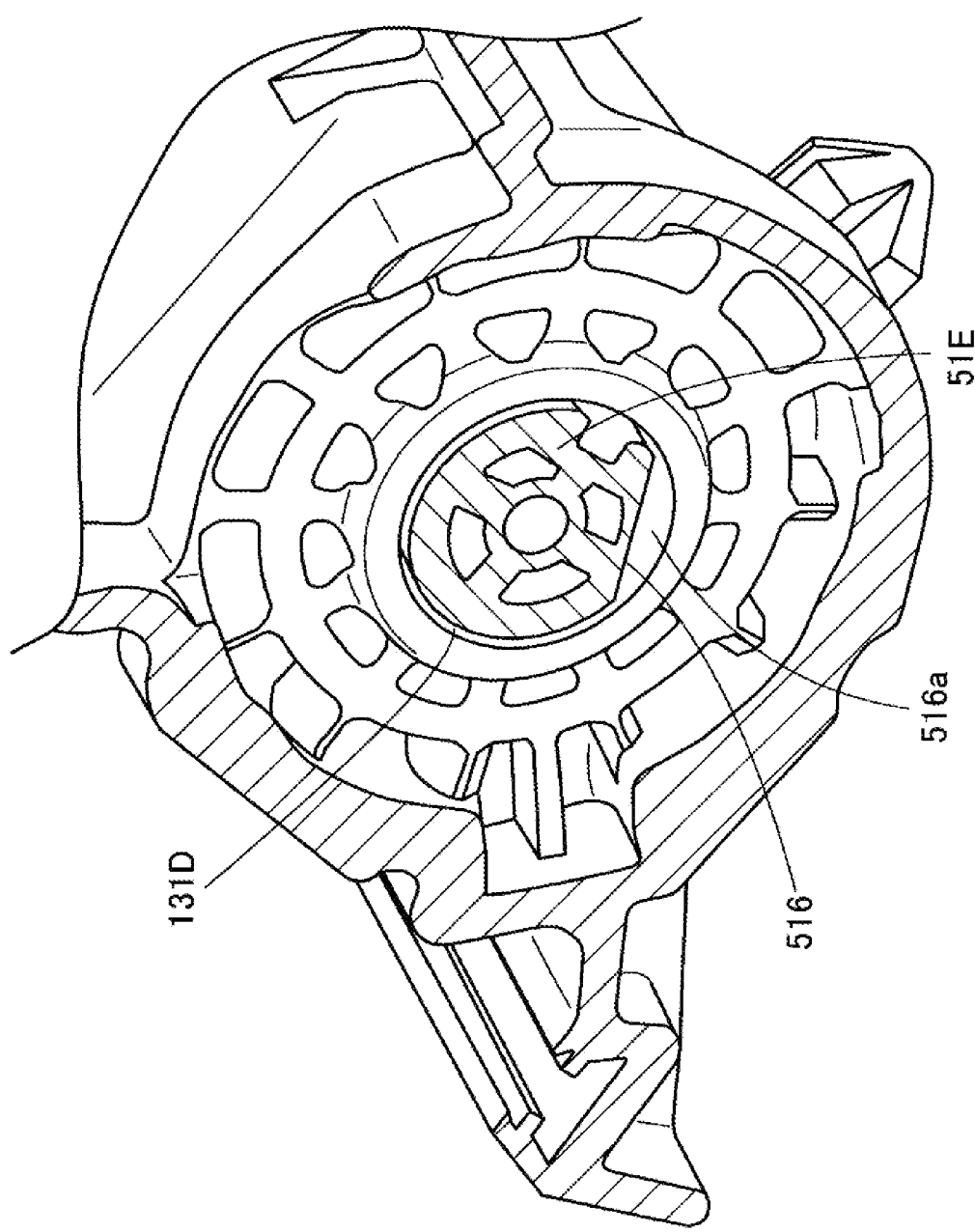
FIG. 26 is a cross-sectional view taken along line XXVI-XXVI of FIG. 22 for explaining a second plane.

As shown in FIG. 25, a gap 515a is formed between the shaft 51E and the first bearing portion 221D by forming the first surface 515. Further, as shown in FIG. 26, a gap 516a is formed between the shaft 51E and the second bearing portion 131D by forming the second surface 516. As a result, when water enters the inside of the case portion 10 from the opening 111, the water flows through the gaps 515a and 516a, and water hardly remains in the first bearing portion 221D and the second bearing portion 131D of the shaft 51E. As a result, when water enters the inside of the case portion 10, it is possible to suppress freezing the shaft 51E, the first bearing portion 221D, and the second bearing portion 131D, and to prevent deterioration of operational feeling and generation of abnormal noise. The water that has flowed into the gaps 515a and 516a then flows vertically downward and is discharged to the outside through holes formed in the case portion 10.

F. Other Embodiments

F1) In the first and second embodiments, one first groove portion and one second groove portion are formed. Two first groove portions and two second groove portions may be formed, or three groove portions may be formed. Also, the number of the first groove portions and the number of the second groove portions may be different. At least one first groove portion and one second groove portion may be formed.

F2) In the above third embodiment, one first passage and one second passage are formed. Two first passages and two second passages may be formed, or three passages may be formed. Also, the number of first passages and second passages may be different. At least one first passage and one second passage should be formed.

F3) In each of the above embodiments, the central axis CA1 and the central axis CA2 are aligned. The central axis CA1 and the central axis CA2 may not be aligned.

The present disclosure should not be limited to the embodiments or modifications described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. An accelerator device, comprising:
 a pad configured to move in an opening direction corresponding to an accelerator opening operation and a closing direction corresponding to an accelerator closing operation and opposite to the opening direction;
 a case portion configured to be attachable to a vehicle body and including:
  a front wall facing the pad and having an opening,
  a rear wall opposite the front wall,
  a first side wall connecting the front wall and the rear wall and forming one side surface of the case portion, and
  a second side wall forming another side surface of the case portion;
 an internal movable mechanism housed within the case portion, and including a shaft rotatably supported by the case portion; and
 an arm passing through the opening and connecting the pad and the internal movable mechanism;
 wherein
 the first side wall includes:
  a first bearing portion configured to receive one end of the shaft, and
  at least one first groove portion provided vertically below a center axis of a surface of the first bearing portion facing the shaft and connected to the first bearing portion, in a state in which the case portion is attached to the vehicle body, and
 the second side wall includes:
  a second bearing portion configured to receive the other end of the shaft, and
  at least one second groove portion provided vertically below a center axis of a surface of the second bearing portion facing the shaft and connected to the second bearing portion, in a state in which the case portion is attached to the vehicle body.

2. The accelerator device according to claim 1, wherein
 a lower surface of the first groove portion is configured to descend along a direction from the one end of the shaft toward the other end of the shaft, and
 a lower surface of the second groove portion is configured to descend from the other end of the shaft toward the one end of the shaft.

3. An accelerator device, comprising:
 a pad configured to move in an opening direction corresponding to an accelerator opening operation and a closing direction corresponding to an accelerator closing operation and opposite to the opening direction;
a case portion configured to be attachable to a vehicle body and including:
a front wall facing the pad and having an opening,
a rear wall opposite the front wall,
a first side wall connecting the front wall and the rear wall and forming one side surface of the case portion, and
a second side wall forming another side surface of the case portion;
an internal movable mechanism housed within the case portion, and including a shaft rotatably supported by the case portion;
an arm passing through the opening and connecting the pad and the internal movable mechanism;
wherein
the first sidewall includes:
a first bearing portion configured to receive one end of the shaft, and
a first passage provided vertically below a center axis of a surface of the first bearing portion facing the shaft, having a first opening that is an opening connected to the first bearing portion for receiving the shaft, in a state in which the case portion is attached to the vehicle body, and configured to communicate with an outside of the case portion,
the second side wall includes:
a second bearing portion configured to receive the other end of the shaft, and
a second passage provided vertically below a center axis of a surface of the second bearing portion facing the shaft, having a second opening that is an opening connected to the second bearing portion for receiving the shaft, in a state in which the case portion is attached to the vehicle body, and configured to communicate with the outside of the case portion,
the first passage is arranged below the first opening in a vertical direction, and
the second passage is arranged below the second opening in the vertical direction.

4. An accelerator device, comprising:
a pad configured to move in an opening direction corresponding to an accelerator opening operation and a closing direction corresponding to an accelerator closing operation and opposite to the opening direction;
a case portion configured to be attachable to a vehicle body and including:
a front wall facing the pad and having an opening,
a rear wall opposite the front wall,
a first side wall connecting the front wall and the rear wall and forming one side surface of the case portion, and
a second side wall forming another side surface of the case portion;
an internal movable mechanism housed within the case portion, and including a shaft rotatably supported by the case portion;
an arm passing through the opening and connecting the pad and the internal movable mechanism;
wherein
the first side wall has a first bearing portion configured to receive one end of the shaft,
the second side wall has a second bearing portion configured to receive the other end of the shaft,
the shaft has:
a first shaft groove provided in an outer peripheral surface of a portion of the shaft located inside the first bearing portion, being recessed toward a central axis direction of the shaft, and extending to the outside of the first bearing portion along the central axis direction of the shaft, and
a second shaft groove provided in an outer peripheral surface of a portion of the shaft located inside the second bearing portion, being recessed toward the central axis direction of the shaft, and extending to an outside of the second bearing portion along the central axis direction of the shaft,
the first shaft groove is provided vertically below a central axis of a surface of the first bearing portion facing the shaft, in a state in which the case portion is attached to the vehicle body, and
the second shaft groove is provided vertically below a central axis of a surface of the second bearing portion facing the shaft, in a state in which the case portion is attached to the vehicle body.

5. An accelerator device, comprising:
a pad configured to move in an opening direction corresponding to an accelerator opening operation and a closing direction corresponding to an accelerator closing operation and opposite to the opening direction;
a case portion configured to be attachable to a vehicle body and including:
a front wall facing the pad and having an opening,
a rear wall opposite the front wall,
a first side wall connecting the front wall and the rear wall and forming one side surface of the case portion, and
a second side wall forming another side surface of the case portion;
an internal movable mechanism housed within the case portion, and including a shaft rotatably supported by the case portion; and
an arm passing through the opening and connecting the pad and the internal movable mechanism;
wherein
the first side wall has a first bearing portion configured to receive one end of the shaft,
the second side wall has a second bearing portion configured to receive the other end of the shaft,
a first plane that is a plane parallel to a central axis direction of the shaft is formed on an outer peripheral surface of the one end of the shaft and extends to an outside of the first bearing portion,
a second plane that is a plane parallel to the central axis direction of the shaft is formed on the outer peripheral surface of the other end of the shaft and extends to the outside of the second bearing portion,
the first plane is provided vertically below a central axis of a surface of the first bearing portion facing the shaft, in a state in which the case portion is attached to the vehicle body, and
the second plane is provided vertically below a central axis of a surface of the second bearing portion facing the shaft, in a state in which the case portion is attached to the vehicle body.

* * * * *